(12) United States Patent
Harada et al.

(10) Patent No.: US 8,707,207 B2
(45) Date of Patent: Apr. 22, 2014

(54) PROGRAM AND METHOD FOR PROVIDING PREDETERMINED PROCESSING WITH REGISTERED ITEMS

(75) Inventors: Yoshiyuki Harada, Saitama (JP); Seiji Harada, Hino (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 726 days.

(21) Appl. No.: 12/606,448

(22) Filed: Oct. 27, 2009

(65) Prior Publication Data

US 2010/0115464 A1 May 6, 2010

(30) Foreign Application Priority Data

Nov. 4, 2008 (JP) ................................. 2008-283528

(51) Int. Cl.
*G06F 3/048* (2013.01)

(52) U.S. Cl.
USPC ........................... 715/810; 715/764; 358/1.15

(58) Field of Classification Search
USPC .......................................... 715/764; 358/1.15
See application file for complete search history.

(56) References Cited

U.S. PATENT DOCUMENTS

| | | | |
|---|---|---|---|
| 8,159,703 B2 * | 4/2012 | Murase | 358/1.15 |
| 2002/0054109 A1 * | 5/2002 | Ogino et al. | 345/764 |
| 2002/0080376 A1 * | 6/2002 | Momose et al. | 358/1.9 |
| 2004/0113941 A1 | 6/2004 | Sliwa et al. | |
| 2004/0113963 A1 * | 6/2004 | Tsujimoto | 347/14 |
| 2004/0163049 A1 * | 8/2004 | Mori et al. | 715/527 |
| 2005/0024355 A1 * | 2/2005 | Yagi | 345/204 |
| 2005/0141013 A1 * | 6/2005 | Kikuchi et al. | 358/1.14 |
| 2006/0087680 A1 * | 4/2006 | Maeda | 358/1.15 |
| 2006/0221372 A1 * | 10/2006 | Onishi et al. | 358/1.13 |
| 2006/0232619 A1 * | 10/2006 | Otsuka et al. | 347/5 |
| 2006/0238793 A1 * | 10/2006 | Akashi et al. | 358/1.13 |

(Continued)

FOREIGN PATENT DOCUMENTS

| | | |
|---|---|---|
| JP | 08-212035 | 8/1996 |
| JP | 2001-022873 | 1/2001 |

(Continued)

OTHER PUBLICATIONS

Notice of Reasons for Refusal dated Aug. 24, 2010, issued in the corresponding Japanese Patent Application No. 2008-283528, and an English Translation thereof.

(Continued)

*Primary Examiner* — Linh K Pham
(74) *Attorney, Agent, or Firm* — Buchanan Ingersoll & Rooney

(57) ABSTRACT

There are described a method and a computer executable program of the same, each of which makes it possible to provide registered items for a predetermined processing, which is established in advance corresponding to user's demands. The method includes: displaying a list of plural registrable items on a display section, which can be registered in order to provide at least one of the plural registrable items for the predetermined processing; accepting a registration instruction for registering said at least one of the plural registrable items, which includes an attribute value that indicates a status of its registration, based on an operation conducted by a user; providing the registered item for the predetermined processing according to the attribute value of the registration concerned; and when the registration instruction is accepted, displaying an attached image, which corresponds to the attribute value of the registration concerned, associating with one of the registrable items.

12 Claims, 18 Drawing Sheets

(56) References Cited

U.S. PATENT DOCUMENTS

| | | | |
|---|---|---|---|
| 2006/0262338 A1* | 11/2006 | Momose et al. | 358/1.13 |
| 2006/0277483 A1* | 12/2006 | Yamamoto | 715/764 |
| 2006/0285141 A1* | 12/2006 | Kim et al. | 358/1.13 |
| 2007/0296995 A1* | 12/2007 | Sakura | 358/1.13 |
| 2008/0098303 A1* | 4/2008 | Murayama | 715/274 |
| 2008/0184156 A1* | 7/2008 | Sato | 715/777 |
| 2008/0209449 A1* | 8/2008 | Maehira | 719/321 |
| 2008/0259390 A1* | 10/2008 | Murase | 358/1.15 |
| 2008/0297838 A1* | 12/2008 | Matsui et al. | 358/1.15 |
| 2009/0006951 A1* | 1/2009 | Mori et al. | 715/273 |
| 2009/0059279 A1* | 3/2009 | Sakurai | 358/1.15 |
| 2009/0077278 A1* | 3/2009 | Kuroda | 710/58 |
| 2009/0135441 A1* | 5/2009 | Sakuraba | 358/1.13 |
| 2009/0303519 A1* | 12/2009 | Shimatani et al. | 358/1.15 |
| 2010/0195153 A1* | 8/2010 | Momose et al. | 358/1.15 |
| 2011/0122443 A1* | 5/2011 | Otsuka et al. | 358/1.15 |
| 2012/0218602 A1* | 8/2012 | Sakura et al. | 358/1.15 |

FOREIGN PATENT DOCUMENTS

| | | | |
|---|---|---|---|
| JP | 2004054432 A * | 2/2004 | |
| JP | 2004-192641 | 7/2004 | |
| JP | 2005-063412 | 3/2005 | |
| JP | 2008-210284 | 9/2008 | |

OTHER PUBLICATIONS

Online document titled "Printer Driver of Postscript 3 Printer Controller, and Image Controller IC-409, Manufacture by EFI Co. Ltd." Issued at Sep. 29, 2008, http://konicaminolta.jp/business/download/copiers/efi/detail.html., 4 Pages.

* cited by examiner

FIG. 5

201 REGISTRABLE ITEM ID TABLE

| ITEM ID | NAME OF ITEM |
|---|---|
| ID_Orientation | DOCUMENT ORIENTATION |
| ID_PaperSize | DOCUMENT SIZE |
| ID_Zoom | ZOOMING |
| ID_InputTray | PAPER SHEET TRAY |
| ID_PaperType | KIND OF PAPER SHEET |
| ID_Nup | ID_Nup |
| ID_NumCopies | NUMBER OF COPIES |
| ID_Duplex | PRINTING SURFACE |
| ID_Staple | STAPLING |
| ID_Punch | PUNCHING |
| ... | ... |

202 REGISTERED STATUS TABLE

| POSITIONAL INFORMATION | ITEM ID |
|---|---|
| ... | ... |
| -3 | ID_Orientation |
| -2 | ID_PaperSize |
| -1 | ID_Zoom |
| 0 | ID_InputTray |
| 1 | ID_PaperType |
| 2 | ID_Nup |
| 3 | ID_NumCopies |
| ... | ... |

203 REGISTERED-STATUS INITIAL SETTING TABLE

| POSITIONAL INFORMATION | ITEM ID |
|---|---|
| -2 | ID_Zoom |
| -1 | ID_NumCopies |
| 0 | ID_Orientation |
| 1 | ID_PaperSize |
| 2 | ID_InputTray |
| ... | ... |

FIG. 6

301 ITEMIZED INFORMATION TABLE

| ITEM ID | HEIGHT | WIDTH |
|---|---|---|
| ID_Orientation | 45 | 120 |
| ID_PaperSize | 35 | 120 |
| ID_Zoom | 45 | 120 |
| ID_InputTray | 35 | 120 |
| ID_PaperType | 35 | 120 |
| ID_Nup | 45 | 120 |
| ID_NumCopies | 25 | 120 |
| ID_Duplex | 25 | 120 |
| ID_Staple | 35 | 120 |
| ID_Punch | 35 | 120 |
| ⋮ | ⋮ | ⋮ |

FIG. 7

DOCUMENT ORIENTATION — 401
- ● VERTICAL(T)
- ○ HORIZONTAL(N)

DOCUMENT SIZE(Z) — 402
A4

602a

602b

PROGRAM AND METHOD FOR PROVIDING PREDETERMINED PROCESSING WITH REGISTERED ITEMS

This application is based on Japanese Patent Application NO. 2008-283528 filed on Nov. 4, 2008, with Japan Patent Office, the entire content of which is hereby incorporated by reference.

BACKGROUND OF THE INVENTION

The present invention relates to a program and a method for providing a predetermined processing with registered items. Concretely speaking, the present invention specifically relates to a program and a method for providing such a processing operation for editing a print setting screen constituted by specific items, which are selected from a plurality of items for specifying printing conditions and which are registered on the basis of the selecting operations conducted by the user, with registered items.

When the user intends to use a printer for implementing a printing operation in a certain printing system, the user operates a personal computer in which a control program, called a printer driver, is installed, to established printing conditions by inputting each of desired setting values with respect to corresponding one of setting items, so as to makes the printer implement the printing operation. According as the performance of the printer has improved and it has become possible for the user to establish various kinds of printing conditions, a number of setting items, being settable by the printer driver, tend to increase.

To cope with such the trend, by categorizing a plurality of setting items into related function groups and by employing tubs to correlate them with each other, the user's recognizability and maneuverability has been improved. In this connection, when the user intends to establish the desired print conditions, the user shifts a current operating screen to a desired screen by selecting a desired tub so as to make the computer display the desired setting items, and then, conducts the operation for setting (changing) the setting items concerned.

Accordingly, when the user intends to establish the print conditions by changing the plurality of setting items, which are correlated by the different tubs, the operating work for setting the print conditions has been quite complicated. To solve the above-problem, Non-patent Document 1, which is an online document titled "PRINTER DRIVER OF POST-SCRIPT 3 PRINTER CONTROLLERS, AND IMAGE CONTROLLER IC-409, MANUFACTURE BY EFI CO. LTD.", issued at Sep. 29, 2008, Konica Minolta, sets forth a technology for registering the setting items for which the user frequently conducts setting operations, in advance, so as to make the computer display such a screen in which the setting items for which the user frequently conducts setting operations are integrally displayed.

According to the technology set forth in Non-patent Document 1, by adding and/or deleting setting items according to the user's setting operations with respect to the operating screen being editable for the user, the setting items for which the user frequently conducts setting operations are integrated into and displayed on a specific operating screen.

However, according to the abovementioned conventional technology, since the registered setting items are integrated into the specific operating screen so as to provide it for the editing operation, it has been possible for the user to merely designate a presence or absence of a registration of the desired setting item, and it has been impossible for the user to designate a kind of state in which the desired setting item is registered.

For instance, according to the abovementioned conventional technology, since the registered setting items are arranged in order within the operational screen, sometimes, a layout of the edited operational screen does not conformity with the demand (request) of the user, resulting in a bad maneuverability.

SUMMARY OF THE INVENTION

To overcome the abovementioned drawbacks in conventional printing systems, it is one of objects of the present invention to provide a method and a computer readable storage medium storing a computer executable program, each of which makes it possible to provide registered items for a predetermined processing, which is established in advance corresponding to user's demands.

Accordingly, at least one of the objects of the present invention can be attained by any one of the computer readable storage mediums and the method described as follows.

(1) According to a computer readable storage medium reflecting an aspect of the present invention, the computer readable storage medium stores a computer executable program for providing a registered item for a predetermined processing, the program being executable by a computer to cause the computer to perform a process comprising: (a) displaying a list of plural registrable items on a display section, which can be registered in order to provide at least one of the plural registrable items for the predetermined processing; (b) accepting a registration instruction for registering said at least one of the plural registrable items, which includes an attribute value that indicates a status of its registration, based on an operation conducted by a user; and (c) providing the registered item for the predetermined processing according to the attribute value of the registration concerned.

(2) According to another aspect of the present invention, in the computer readable storage medium recited in item 1, the process further comprises: (d) displaying an attached image, which corresponds to the attribute value of the registration concerned, associating with said at least one of the plural registrable items included in the list of the plural registrable items, for which the registration instruction is accepted, when the registration instruction is accepted in the step (b).

(3) According to still another aspect of the present invention, in the computer readable storage medium recited in item 1 or item 2, the process further comprises: (e) accepting a user's selecting operation for selecting a specific list-selection tub from a plurality of list-selection tubs, which is displayed on the display section corresponding to each of plural fixed tubs used for displaying fixed and predetermined items on the display section to conduct setting operations, before performing the step (a); wherein, in the step (a), a list of items, which corresponds to the specific list-selection tub selected by the user, is displayed on the displayed section as a list of plural registrable items to be provided for the predetermined processing.

(4) According to still another aspect of the present invention, in the computer readable storage medium recited in any one of items 1-3, the predetermined processing is defined as such a processing for editing a print setting screen constituted by items, which are registered, based on a user's operation for selecting them from plural items for specifying print conditions.

(5) According to still another aspect of the present invention, in the computer readable storage medium recited in item 4, the attribute value is represented by positional information of an item residing within the print setting screen.
(6) According to still another aspect of the present invention, in the computer readable storage medium recited in item 5, the positional information is defined as either left-positional information or right-positional information.
(7) According to still another aspect of the present invention, in the computer readable storage medium recited in any one of items 1-6, the process further comprises: (f) accepting a change of the attribute value, based on an operation conducted by the user, after the registration instruction is accepted in the step (b).
(8) According to a method reflecting yet another aspect of the present invention, the method for providing a registered item for a predetermined processing, comprises: (a) displaying a list of plural registrable items on a display section, which can be registered in order to provide at least one of the plural registrable items for the predetermined processing; (b) accepting a registration instruction for registering said at least one of the plural registrable items, which includes an attribute value that indicates a status of its registration, based on an operation conducted by a user; and (c) providing the registered item for the predetermined processing according to the attribute value of the registration concerned.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 shows exemplified tables, each of which serves as an attribute-value information table;

FIG. 6 shows a table exemplifying an itemized information table;

FIG. 7 shows a schematic diagram exemplifying a setting item in a My-tub screen;

DETAILED DESCRIPTION OF THE PREFERRED EMBODIMENT

Figure 1:
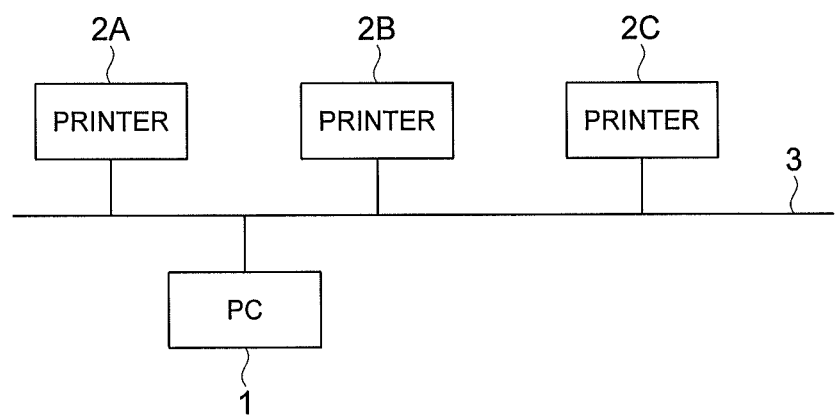
FIG. 1 shows a block diagram indicating an overall configuration of a printing system embodied in the present invention.

Referring to the drawings, a preferred embodiment of the present invention will be detailed in the following.

FIG. 1 shows a block diagram indicating an overall configuration of a printing system embodied in the present invention.

As shown in FIG. 1, the printing system, embodied in the present invention, is constituted by a personal computer 1 (hereinafter, referred to as a PC1), a printer 2A, a printer 2B and a printer 2C, which are communicatively coupled to each other through a network 3. In this connection, a number of apparatuses and kinds of apparatuses, which are to be coupled to the network 3 is not limited to those shown in FIG. 1. Further, it is also applicable that the PC1 is directly coupled to the printer 2A, the printer 2B and the printer 2C in a local coupling mode without employing the network 3.

For instance, the network 3 is any one of various kinds of networks, such as an Ethernet (Registered Trademark), a token ring, a LAN (Local Area Network) in which computers and networking apparatuses are coupled to each other based on the specifications complying with the FDDI (Fiber Distributed Data Interface), etc., a WAN (Wide Area Network) in which plural LANs are coupled to each other through an exclusive communication line, etc., or any combination of them.

Figure 2:
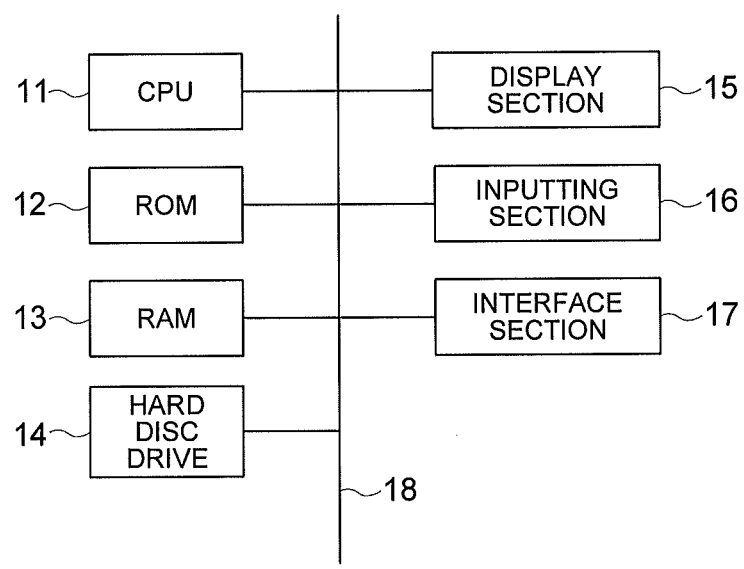
FIG. 2 shows a block diagram indicating a configuration of a PC1 shown in FIG. 1.

FIG. 2 shows a block diagram indicating a configuration of the PC1 shown in FIG. 1. The PC1 is provided with a CPU (Central Processing Unit) 11, a ROM (Read Only Memory) 12, a RAM (Random Access Memory) 13, a HDD (Hard Disc Drive) 14, a display section 15, an inputting section 16 and an interface section 17, which are coupled to each other through a bus 18 for transacting various kinds of signals between them.

The CPU 11 executes programs concerned, so as to implement various kinds of operations for controlling the above-mentioned sections provided in the PC1 and various kinds of arithmetic calculations. The ROM 12 stores various kinds of programs and various kinds of data, therein. The RAM 13 serves as a working memory area to temporarily store the programs currently executed and the data currently used. Further, the HDD 14 stores various kinds of programs including an Operating System and various kinds of data, therein.

The display section 15 is constituted by a CRT (Cathode Ray Tube) or a LCD (Liquid Crystal Display), etc., so as to display various kinds of information thereon. The inputting section 16 includes a pointing device, such as a mouse, etc., and a keyboard, which are used for conducting various kinds of inputting operations.

The interface section 17 serves as an interface for communication with the other external apparatuses, including the printer 2A, the printer 2B, the printer 2C, etc., through the network 3. Other than the network interface, which complies with the specification of the network, such as the Ethernet (Registered Trademark), the token ring, the FDDI, etc., any one or any combination of various kinds of interface devices, including a serial interface such as the USB (Universal Serial Bus), the IEEE1394, etc., various kinds of parallel interfaces, such as the SCSI (Small Computer System Interface), the IEEE1284, etc., various kinds of local connection interfaces, such as various kinds of wireless interfaces including the Bluetooth (Registered Trademark), the IEEE802.11, the HomeRF (Home Radio Frequency), the IrDA (Infrared Data Association), etc., etc., the telephone line interface for connecting to the telephone line, etc., can be employed as the interface section 17.

Further, an application program for creating a document file and the printer driver are installed in advance into the HDD 14. The printer driver is employed not only for setting each of the setting items so as to define the printing conditions based on the inputting operations conducted by the user from a print setting screen detailed later, but also for creating print data in such a format that is processable for the printer 2A, the printer 2B and the printer 2C, based on original data created by executing the document-file creating application program.

Figure 3:
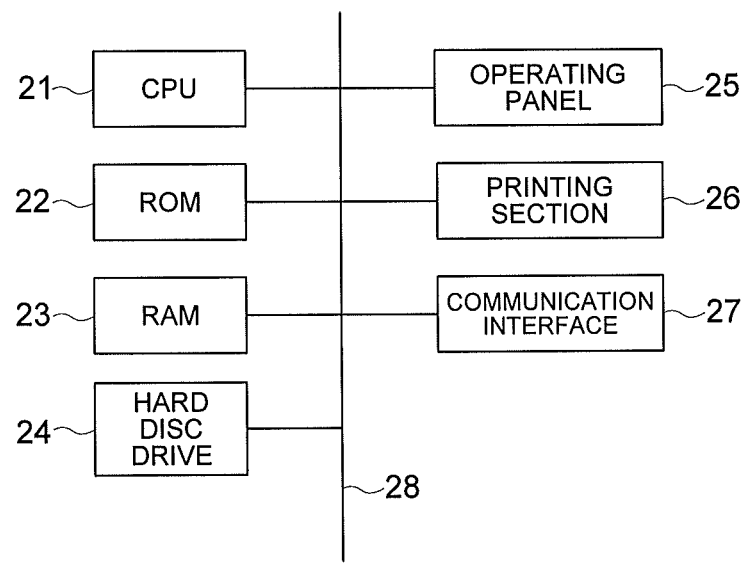
FIG. 3 shows a block diagram indicating a configuration of each of printers, shown in FIG. 1.

FIG. 3 shows a block diagram indicating a configuration of each of the printer 2A, the printer 2B and the printer 2C, shown in FIG. 1. Each of the printer 2A, the printer 2B and the printer 2C includes a CPU 21, a ROM 22, a RAM 23, an HDD 24, an operating panel 25, a printing section 26 and a communication interface 27, which are coupled to each other through a bus 28 for transacting various kinds of signals between them. In this connection, in order to avoid duplicated explanations, among the abovementioned sections included in each of the printer 2A, the printer 2B and the printer 2C, the explanation for the section having the same function as that of the PC1 will be omitted in the following.

The operating panel 25 is provided with such elements that are a touch panel, a ten key, a start button, a stop button, etc., which are used for displaying various kinds of information thereon and inputting various kinds of instructions and designations therefrom. The printing section 26 prints an image based on various kinds of data onto a recording medium, such as a paper sheet, etc., through any one of well-known image forming processes, such as an electro-photographic image forming process, etc.

In this connection, it is applicable that each of the PC1, the printer 2A, the printer 2B and the printer 2C includes a structural element other than the abovementioned structural elements, or does not includes any one of the abovementioned structural elements. For instance, the case in which the printer 2A is employed will be detailed in the following.

Figure 4:
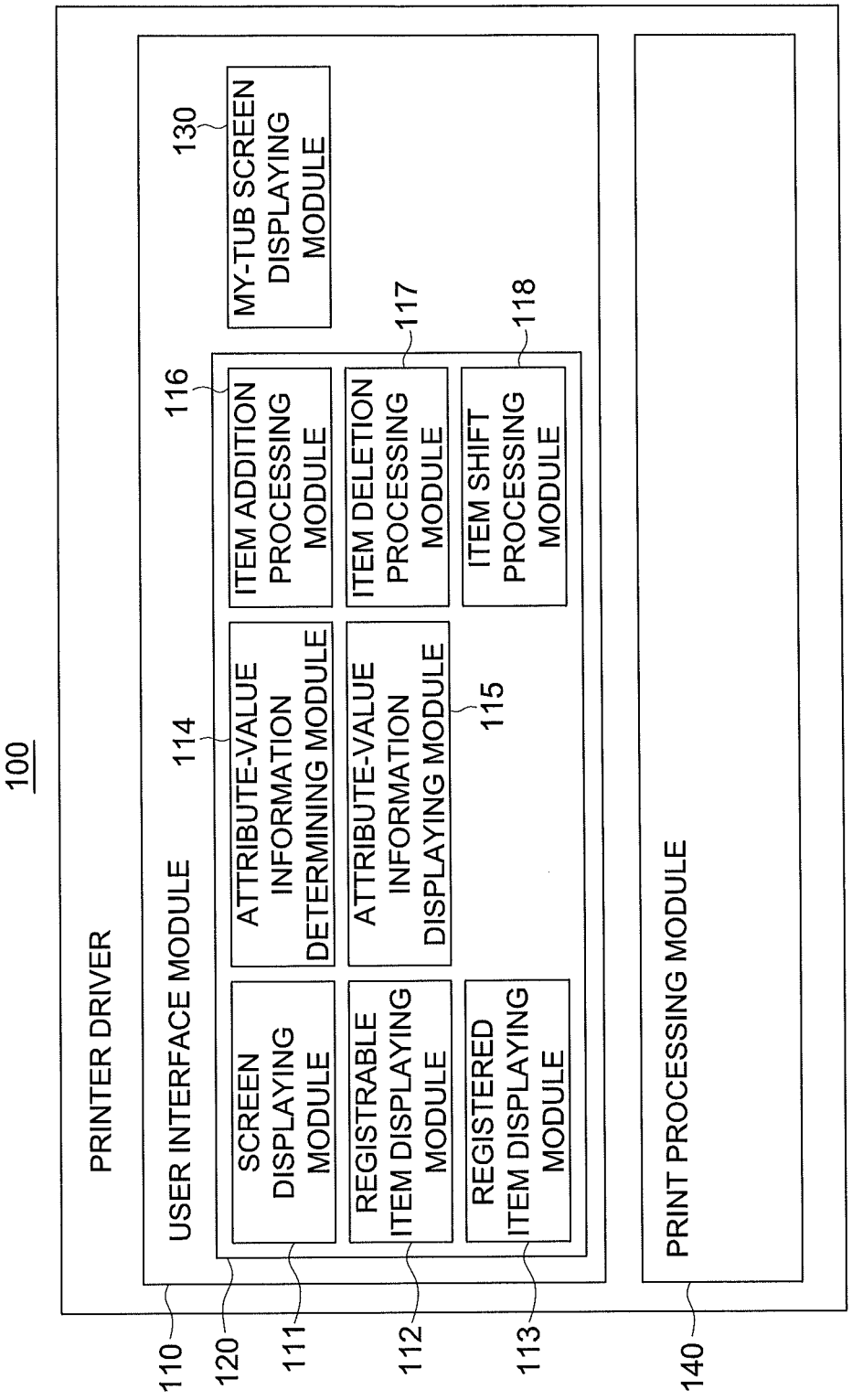
FIG. 4 shows a functional block diagram indicating a fundamental configuration of a printer driver.

FIG. 4 shows a functional block diagram indicating a fundamental configuration of the printer driver.

In the PC1, the printer driver is executed under the controlling actions conducted by the OS (Operating System). A printer driver 100 includes a user interface module 110 and a print processing module 140.

The user interface module 110 conducts an operation for providing the user with the GUI (Graphical User Interface) on which the user can perform various kinds of inputting operations. The user interface module 110 includes a processing module 120 for processing a My-tub editing screen and a My-tub screen displaying module 130. In this connection, hereinafter, a My-tub screen is defined as such a print setting screen that is constituted by specific setting items, which are registered on the basis of the selecting operation, conducted by the user, for selecting them from a plurality of setting items for defining the print conditions. Each of the setting items (hereinafter, also referred to as items, for simplicity) corresponds to each of the functions possessed by the printer concerned.

The processing module 120 for processing the My-tub editing screen includes a screen displaying module 111, a registrable item displaying module 112, a registered item displaying module 113, an attribute-value information determining module 114, an attribute-value information displaying module 115, an item addition processing module 116, an item deletion processing module 117 and an item shift processing module 118.

The screen displaying module 111 performs general processing, such as a screen generating operation of the screen display, etc. The registrable item displaying module 112 performs a processing operation for displaying a list of registrable items. The registered item displaying module 113 performs a processing operation for displaying a list of registered items. The attribute-value information determining module 114 performs a processing operation for determining whether or not an icon should be displayed and, when determining that the icon should be displayed, what kind of icon should be displayed, based on the list of the registrable items and the other list of the registered items. The attribute-value information displaying module 115 performs a processing operation for displaying an icon with respect to each of registrable items displayed on the screen, based on the determined result outputted by the attribute-value information determining module 114. The item addition processing module 116 performs a change-processing operation for changing attribute-value information concerned, when performing a processing operation for adding an item to the list of the registrable items. The item deletion processing module 117 performs a change-processing operation for changing attribute-value information concerned, when performing a processing operation for deleting an item from the list of the registrable items. Finally, the item shift processing module 118 performs a change-processing operation for changing attribute-value information concerned, when performing a processing operation for shifting an item in an up-down direction and/or a left-right direction within the list of the registered items.

The My-tub screen displaying module 130 displays the My-tub screen, based on information of the list of the registered items. In this connection, the user interface module 110 is also provided with a fixed screen displaying module (not shown in the drawings) for displaying a fixed screen serving as a print setting screen constituted by prescribed setting items, fixed (namely, determined in advance).

The print processing module 140 creates print data based on the print conditions established by operating the inputting section 16 through the print setting screen by the user. After that, the print processing module 140 transmits the created print data to the printer 2A.

FIG. 5 shows exemplified tables, each of which serves as an attribute-value information table. The attribute-value information tables include a registrable item ID table 201, a registration status table 202 and a registered-status initial setting table 203. The abovementioned attribute-value information tables are stored in the HDD 14.

In the registrable item ID table 201, an item ID 204, which is to be uniquely attached to each of the registrable items, and an item name 205, which is to be combined with the item ID 204, are defined.

In the registration status table 202, an item ID 207 of each of the registered items and positional information 206 of the registered item concerned are stored. A value represented by the positional information 206 indicates a display position of the concerned item within the My-tub screen. The registered item, having the value represented by the positional information 206 being equal to or greater than "0", is displayed on the <left area> in the list of the registered items. While, the other registered item, having the value represented by the positional information 206 being smaller than "0", is displayed on the <right area> in the list of the registered items. Further, the displaying order of them varies depending on the magnitude of the value represented by the positional information 206.

When the registration status table 202 is not stored in the HDD 14, the registered-status initial setting table 203 is employed as the initial setting of the registration status table 202. In the registered-status initial setting table 203, an item ID 209 of each of the initial setting items and positional information 208 of the concerned item are stored. The configuration of the registered-status initial setting table 203 is same as that of the registration status table 202.

FIG. 6 shows a table exemplifying an itemized information table. The itemized information table includes information in regard to each of setting items being structural elements of the My-tub screen, which are stored in the HDD 14.

As shown in FIG. 6, an itemized information table 301 retains an item ID 302, and a "height" 303 and a "width" 304 of a display area to be used by each of the setting items (screen structural control) corresponding to the item ID 302 concerned.

FIG. 7 shows a schematic diagram exemplifying the setting item in the My-tub screen. A setting item 401 is an example of a "document orientation", which is such a setting item that is to be combined with the item ID of "ID_Orientation". A setting item 402 is an example of a "document size", which is such a setting item that is to be combined with the item ID of "ID_PaperSize".

Figure 8:
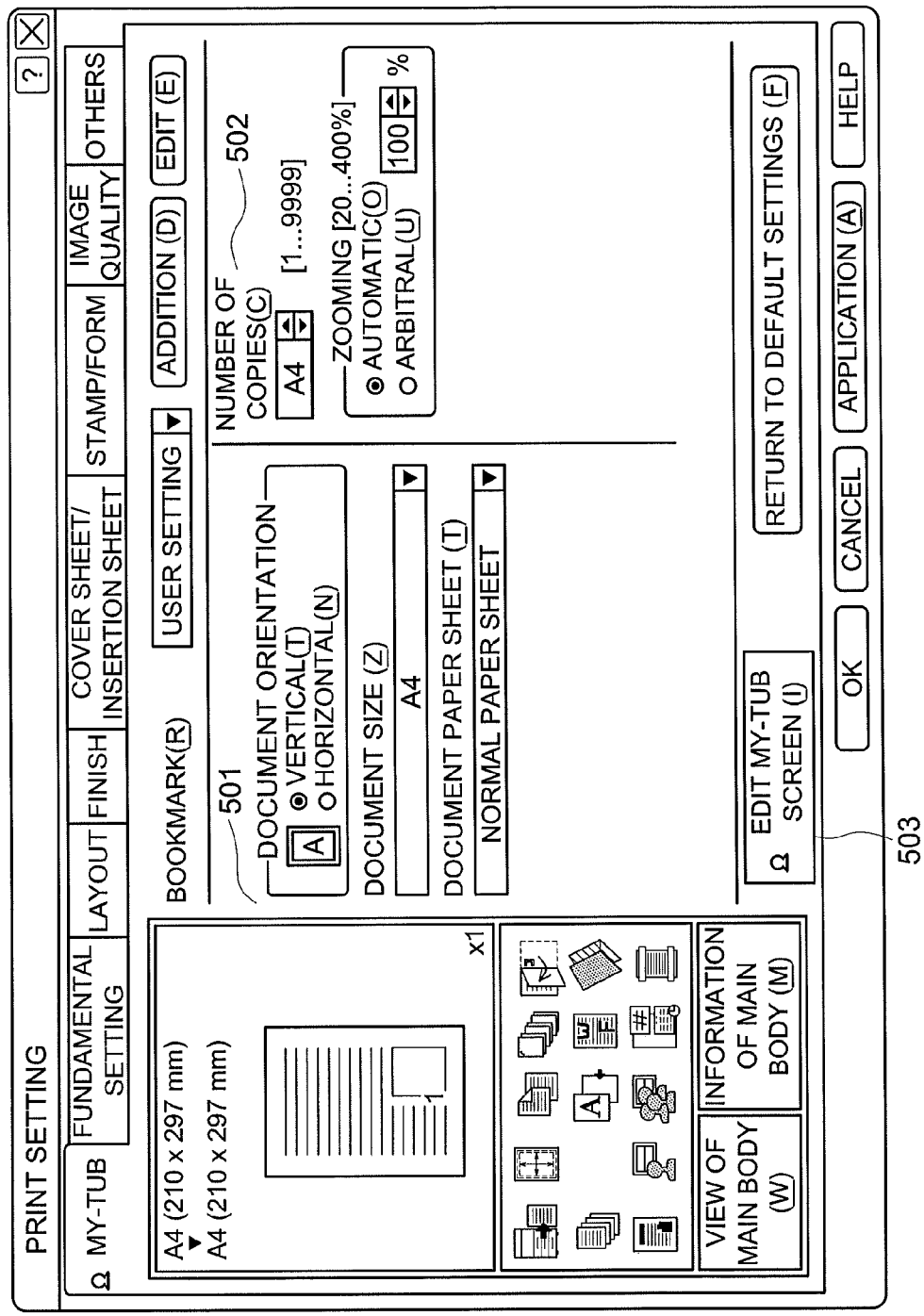
FIG. 8 shows a schematic diagram exemplifying a print setting screen of a printer driver.

FIG. 8 shows a schematic diagram exemplifying a print setting screen of the printer driver.

The print setting screen is provided with a plurality of tubs, in each of which plural setting items are functionally categorized and correlated with each other. According to the window of the GUI screen, the tubs make it possible for the user to use plural kinds of screens by changing them from one to another within a single window.

As exemplified in FIG. 8, various kinds of tub names, such as the "My-tub", the "FUNDAMENTAL SETTING", the "LAYOUT", the "FINISHING", the "COVER/INSERTION PAPER SHEET", the "STAMP/FORM", the "IMAGE QUALITY" and the "OTHERS", are attached to the tubs in the print setting screen, respectively.

As for the "My-tub", among the prescribed setting items, which are determined in advance and correlated to plural fixed tubs, arbitral setting items registered by the user's operation are correlated to the "My-tub". In this connection, the tubs other than the "My-tub" are defined as the fixed tubs. Concretely speaking, the setting items, which are functionally categorized and respectively correlated to the fixed tubs, are aggregated into the "My-tub", serving as a single tub, by corresponding to the user's operation. Accordingly, since the setting items being necessary for the user are aggregated into the single tub (namely, the "My-tub"), it becomes possible for the user to easily perform the operating work for establishing the print conditions by using the "My-tub" without repeatedly selecting the necessary tub one by one from the plural fixed tubs.

In the example shown in FIG. 8, the user selects the "My-tub", and a My-tub screen 500 in which setting items correlated to the "My-tub" are indicated, is displayed as the print setting screen. The My-tub screen 500 includes a setting item list <LEFT AREA> 501 and a setting item list <RIGHT AREA> 502, each of which serves as a list of setting items to be displayed within the My-tub screen. In the screen shown in FIG. 8, the setting items, such as the "DOCUMENT ORIENTATION", the "DOCUMENT SIZE" and the "DOCUMENT PAPER SHEET" are displayed on the setting item list <LEFT AREA> 501, while the other setting items, such as the "NUMBER OF COPIES" and the "ZOOMING", are displayed on the setting item list <RIGHT AREA> 502. It is possible for the user to establish the print conditions through each of the setting items displayed.

A My-tub screen editing button 503 serves as a triggering button for calling the My-tub editing screen, from which the user can perform various kinds of operations for editing the My-tub screen, such as operations for adding, changing and deleting an setting item to be registered into the My-tub screen, etc.

Figure 9:
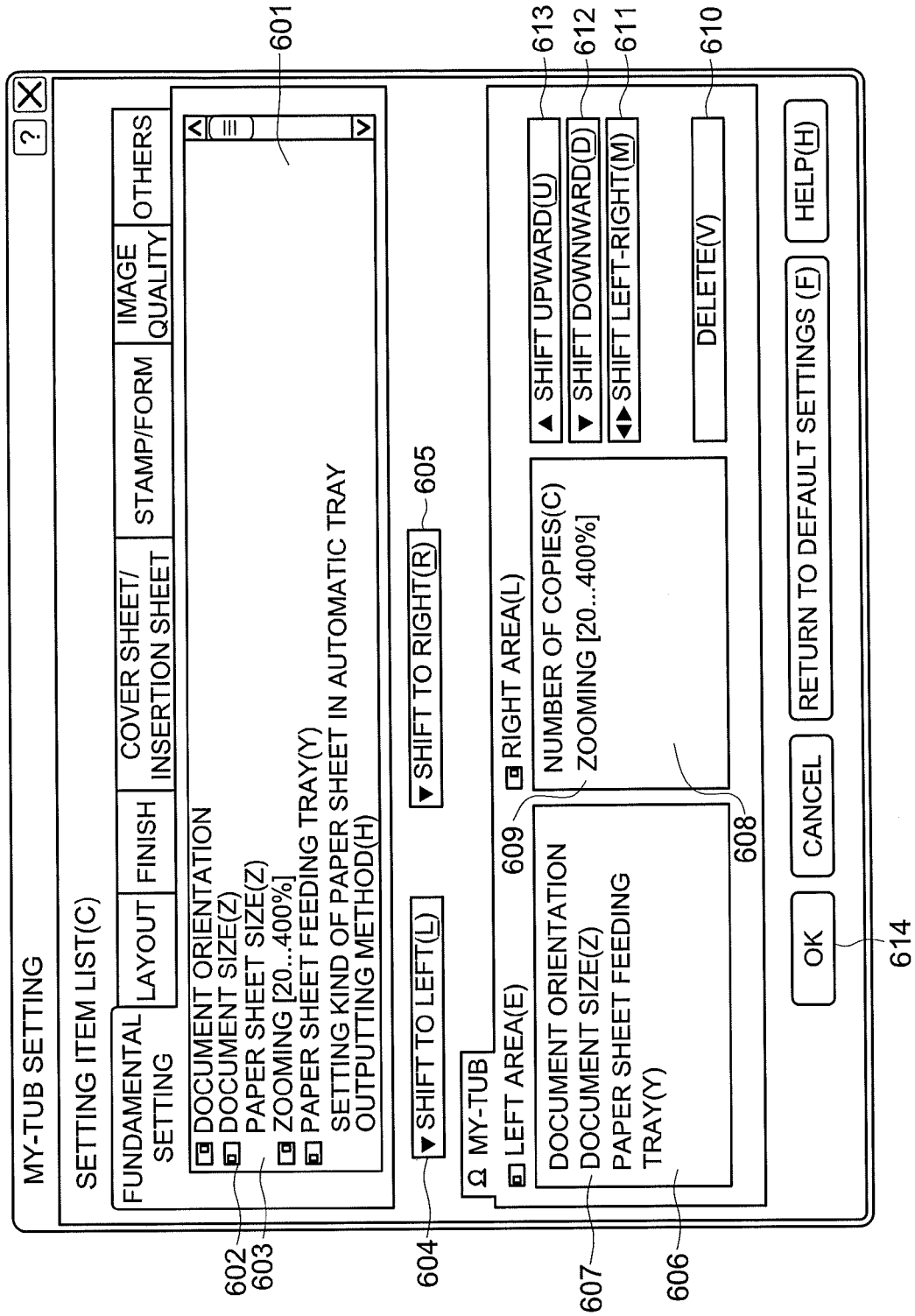
FIG. 9 shows a schematic diagram exemplifying a My-tub editing screen 600 to be used for editing a My-tub screen.

FIG. 9 shows a schematic diagram exemplifying a My-tub editing screen 600 to be used for editing the My-tub screen. A list of plural registrable items (names) 603 and registration status icons 602, each of which is attached to each of the plural registrable items 603 are displayed in a registrable item list 601, in order to provide the user with them for editing the My-tub screen.

A "SHIFT TO LEFT" button 604 serves as a button for adding a setting item selected from the registrable items displayed within the registrable item list 601, to a registered item list <LEFT AREA> 606. When no setting item is selected from the items in the registrable item list 601, the "SHIFT TO LEFT" button 604 is displayed in the gray-out mode, so as to disable its depression. A "SHIFT TO RIGHT" button 605 serves as a button for adding a setting item selected from the registrable items displayed within the registrable item list 601, to a registered item list <RIGHT AREA> 608. When no setting item is selected from the items in the registrable item list 601, the "SHIFT TO RIGHT" button 605 is displayed in the gray-out mode, so as to disable its depression. Further, for instance, when the setting item, which has been already registered in the registered item list <LEFT AREA> (or which has been already registered in the registered item list <RIGHT AREA>), is selected in the registrable item list 601, it is applicable that the system is so constituted that the "SHIFT TO LEFT" button 604 (or "SHIFT to RIGHT" button 605) is displayed in the gray-out mode.

In the registered item list <LEFT AREA> 606, a registered item (name) 607, designated by depressing the "SHIFT TO LEFT" button 604, is displayed. While, in a registered item list <RIGHT AREA> 608, a registered item (name) 609, designated by depressing the "SHIFT TO RIGHT" button 605, is displayed.

Associating with the item for which the registering instruction is accepted among the registrable items listed in the registrable item list 601, the registration status icon 602 is also displayed. The registration status icon 602 is an additional image corresponding to the attribute value indicating the registration status of the concerned item. In this embodiment, the attribute value serves as the positional information of the concerned item within the My-tub screen. In addition, the concerned positional information represents either the left area or the right area. In this embodiment, the additional image is determined corresponding to the attribute value and stored in the HDD 14. However, it is also applicable that the system is so constituted that the additional image is determined on the basis of the user's operations.

Figure 10:
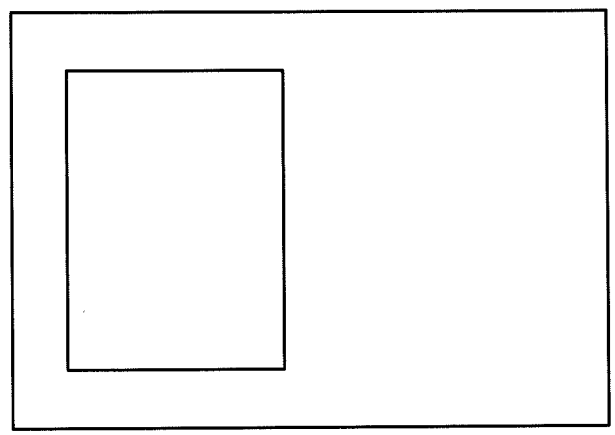
FIG. 10 shows a schematic diagram exemplifying a <LEFT AREA> icon.
Figure 11:
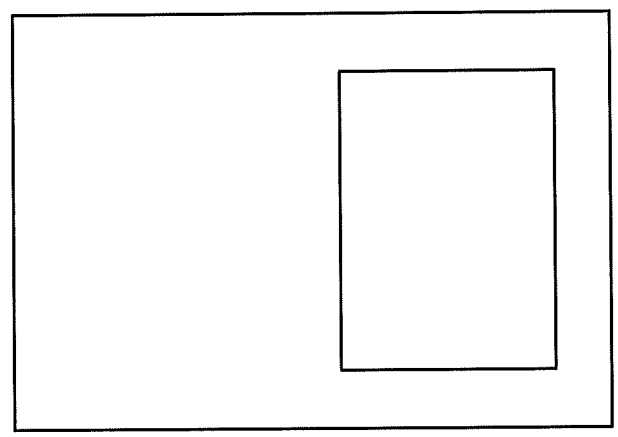
FIG. 11 shows a schematic diagram exemplifying a <RIGHT AREA> icon.

When the concerned item is registered in the registered item list <LEFT AREA> 606, a <LEFT AREA> icon 602a shown in FIG. 10 is displayed as the registration status icons 602, while, when the concerned item is registered in the registered item list <RIGHT AREA> 608, a <RIGHT AREA> icon 602b shown in FIG. 11 is displayed as the registration status icons 602. Further, with respect to the item, which is registered in neither the registered item list <LEFT AREA> 606 nor the registered item list <RIGHT AREA> 608, the registration status icons 602 is not displayed.

In the present embodiment, the <LEFT AREA> icon 602a is displayed in such a manner that the <LEFT AREA> icon 602a is also attached to the registered item list <LEFT AREA> 606, while, the <RIGHT AREA> icon 602b is displayed in such a manner that the <RIGHT AREA> icon 602b is also attached to the registered item list <RIGHT AREA> 608. Accordingly, it becomes possible for the user to intuitively and speedily grasp (determine) whether the concerned item selected from the registrable item list 601 has been registered into the registered item list <LEFT AREA> 606 or into the registered item list <RIGHT AREA> 608.

In this connection, the scope of the additional image, corresponding to the attribute value indicating the registration status, is not limited to such the icon as indicated in the present embodiment. For instance, a character string of "LEFT", "RIGHT", etc., or a kind of a symbol would be applicable for this purpose.

By depressing a delete button 610, it is possible to delete the selected item included in either the registered item list <LEFT AREA> 606 or the registered item list <RIGHT AREA> 608.

By depressing a left-right shift button 611, it is possible to shift the setting item selected in either the registered item list <LEFT AREA> 606 or the registered item list <RIGHT AREA> 608 in a direction of left or right relative to each other. Concretely speaking, the depressing action of the left-right shift button 611 makes it possible to shift the concerned item from the registered item list <LEFT AREA> 606 to the registered item list <RIGHT AREA> 608, or to shift the concerned item from the registered item list <RIGHT AREA> 608 to the registered item list <LEFT AREA> 606.

A depressing action of a "SHIFT DOWNWARD" button 612 makes it possible to shift the concerned item, selected in the registered item list <LEFT AREA> 606 or the registered item list <RIGHT AREA> 608, downward within the same list. A depressing action of a "SHIFT UPWARD" button 613 makes it possible to shift the concerned item, selected in the registered item list <LEFT AREA> 606 or the registered item list <RIGHT AREA> 608, upward within the same list.

When no setting item is selected from the items in both the registered item list <LEFT AREA> 606 and the registered item list <RIGHT AREA> 608, the delete button 610, the left-right shift button 611, the "SHIFT DOWNWARD" button 612 and the "SHIFT UPWARD" button 613 are displayed in the gray-out mode, so as to disable its depression. Further, it is also applicable that, when the item positioned at the lowest line is selected in the registered item list <LEFT AREA> 606 or the registered item list <RIGHT AREA> 608, the "SHIFT DOWNWARD" button 612 are displayed in the gray-out mode, while, when the item positioned at the highest line is selected in the registered item list <LEFT AREA> 606 or the registered item list <RIGHT AREA> 608, the "SHIFT UPWARD" button 613 are displayed in the gray-out mode.

An OK button 614 is used for fixing the editing results performed on the My-tub screen. By depressing the OK button 614, the My-tub editing screen 600 is closed.

Next, referring to FIGS. 12 through 20, operations of the processing module 120 for the My-tub editing screen 600 will be detailed in the following.

Figure 12:
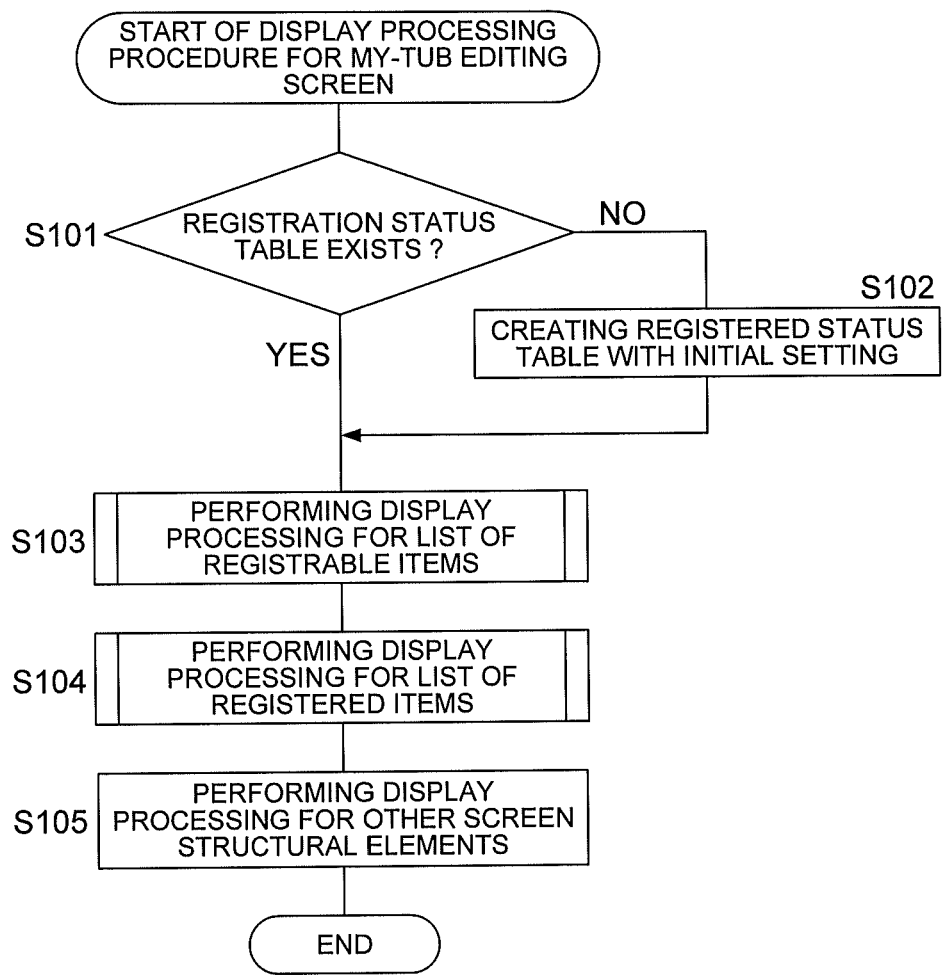
FIG. 12 shows a flowchart indicating a display processing procedure for a My-tub editing screen.

FIG. 12 shows a flowchart indicating a display processing procedure for the My-tub editing screen 600 (shown in FIG. 9). In this connection, the algorism indicated in the flowchart shown in FIG. 12 is stored in the HDD 14 as the program, which is to be read out onto the RAM 13 and executed by the CPU 11 of the PC1.

The processing procedure in the flowchart shown in FIG. 12 is implemented at the time when the My-tub editing screen 600 is initially displayed, or when any one of the actions for adding a new item, deleting an item, etc., is performed.

Initially, the CPU 11 performs a checking operation to determine whether or not the registration status table 202 (shown in FIG. 5) exists in the HDD 14 (Step S101).

As a result of the checking operation performed in Step S101, when determining that the registration status table 202 does not exist in the HDD 14 (Step S101; No), the CPU 11 reads the registered-status initial setting table 203 (shown in FIG. 5) so as to create the registration status table 202 (Step S102).

On the other hand, as a result of the checking operation performed in Step S101, when determining that the registration status table 202 exists in the HDD 14 (Step S101; Yes), the CPU 11 makes the processing procedure proceed to Step S103 without performing the processing in Step S102.

In Step S103, the CPU 11 performs the display processing for the list of registrable items.

Successively, in Step S104, the CPU 11 performs the other display processing for the list of registered items.

In this connection, the display processing for the list of registrable items, to be performed in Step S103, and the other display processing for the list of registered items, to be performed in Step S104, will be detailed later on.

Still successively, in Step S105, the CPU 11 performs still the other display processing for the other screen structural elements, such as the adding button, the delete button, etc. As the result, the My-tub editing screen 600 (shown in FIG. 9) is displayed on the display section 15.

Figure 13:
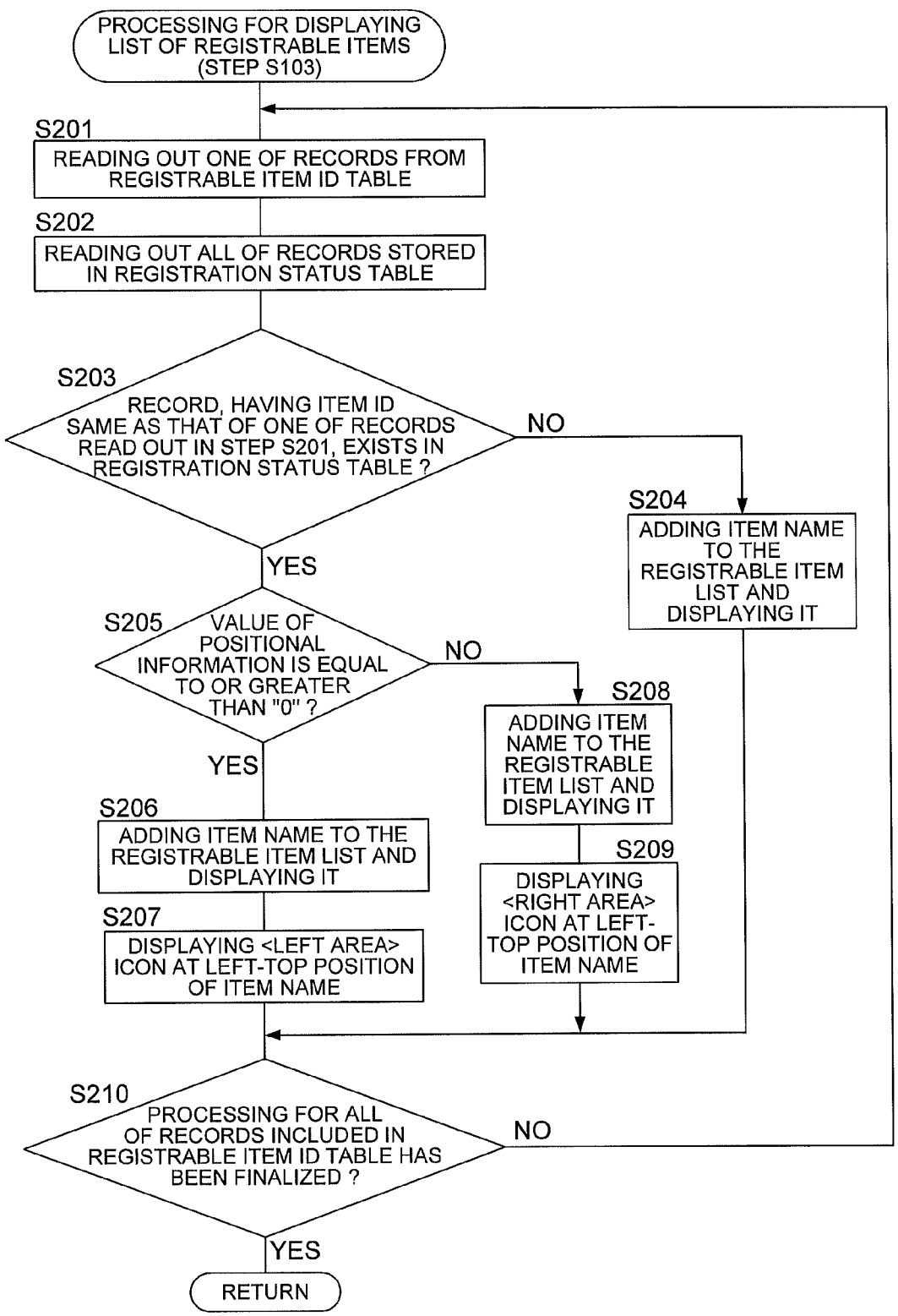
FIG. 13 shows a flowchart indicating a processing procedure for displaying a list of registrable items.

FIG. 13 shows a flowchart indicating a processing procedure for displaying the list of registrable items (Step S103).

Initially, the CPU 11 reads out one of records, which are currently remaining unread, from the registrable item ID table 201 (shown in FIG. 5) (Step S201).

Successively, the CPU 11 reads out all of records stored in the registration status table 202 (shown in FIG. 5) (Step S202). In this connection, when the registration status table 202 has been read out and currently exists in the RAM 13, the CPU 11 may skip the processing in Step S202.

Still successively, in Step S203, the CPU 11 determines whether or not a record, having the item ID same as that of the one of records read out in Step S201, exists in the registration status table 202, which has read out in Step S202.

As a result of the determining operation, when determining that a record having the same item ID does not exist (Step S203; No), the CPU 11 makes the processing procedure proceed to Step S204. In Step S204, the CPU 11 adds the item (name) of the concerned record read out in Step S201 to the registrable item list 601 and displays it on the screen.

As a result of the determining operation, when determining that a record having the same item ID exists (Step S203; Yes), the CPU 11 makes the processing procedure proceed to Step S205.

In Step S205, the CPU 11 determines whether or not the value of the positional information, which indicates the registration status of the concerned item determined that the same item ID exists, is equal to or greater than "0", namely, whether the registered item concerned is to be displayed on the registered item list <RIGHT AREA> or the registered item list <LEFT AREA>.

When the value of the positional information is equal to or greater than "0" (Step S204; Yes), the CPU 11 adds the item (name) of the concerned record, read out in Step S201, to the registrable item list 601 and displays it on the screen (Step S206), and at the same time, also displays the <LEFT AREA> icon 602a (shown in FIG. 10) at the left-top position of the item (name) in the registrable item list 601 as its associated display (Step S207).

On the other hand, when the value of the positional information is smaller than "0" (Step S204; No), the CPU 11 adds the item (name) of the concerned record, read out in Step S201, to the registrable item list 601 and displays it on the screen (Step S208), and at the same time, also displays the <RIGHT AREA> icon 602b (shown in FIG. 11) at the left-top position of the item (name) in the registrable item list 601 as its associated display (Step S209).

Successively, in Step S210, the CPU 11 determines whether or not the processing for all of the records included in the registrable item ID table 201 has been finalized, namely, the CPU 11 confirms whether or not a record that is still remaining unread from the registrable item ID table 201 exists.

As a result of the confirmation, when determining that the processing for all of the records has been finalized (Step S210; Yes), the CPU 11 finalizes the processing procedure shown in FIG. 13, and makes the processing procedure proceed to Step S104 in the flowchart shown in FIG. 12.

On the other hand, when confirming that a record that is still remaining unread exists (Step S210; No), the CPU 11 makes the processing procedure return to Step S201.

Figure 14:
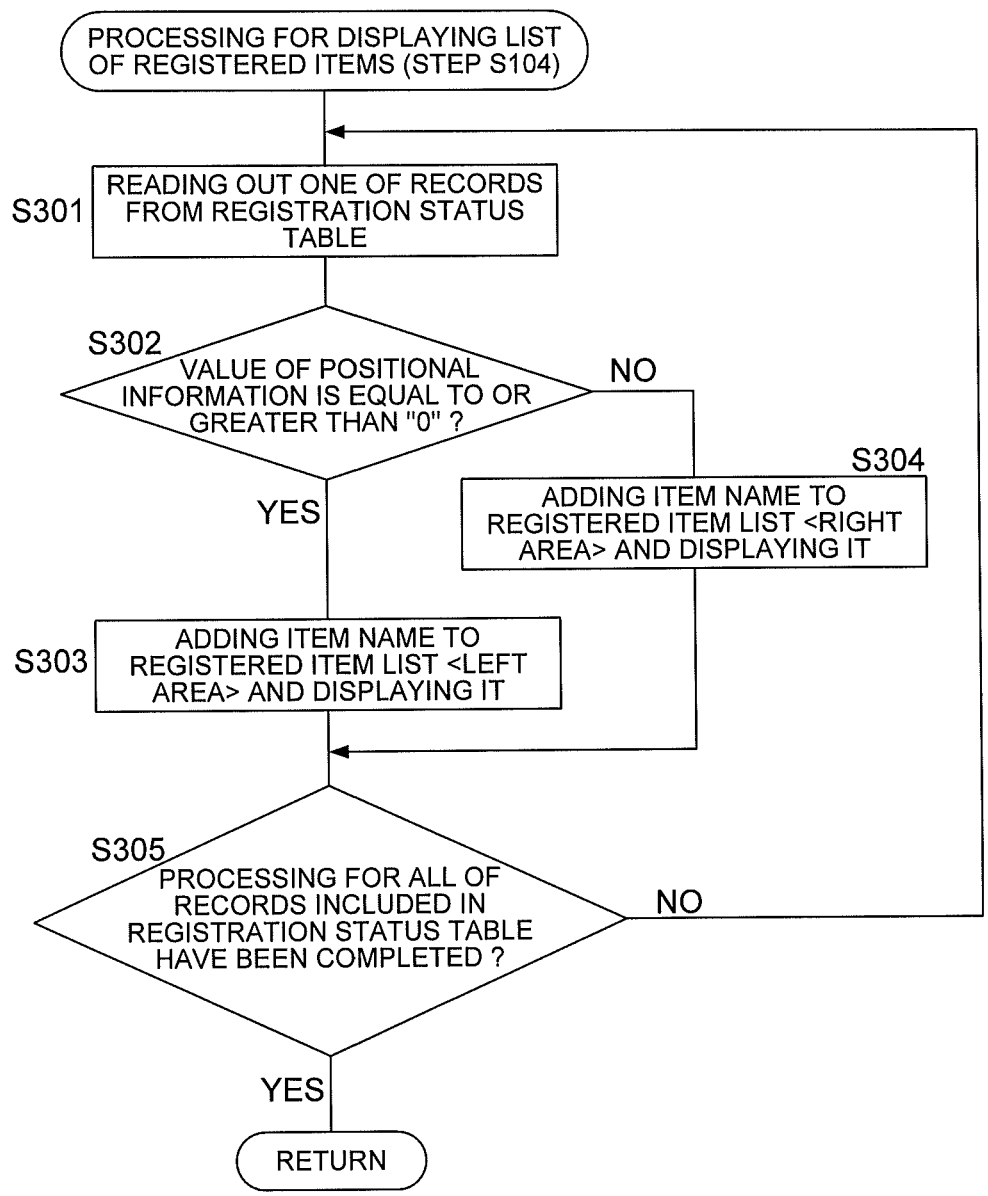
FIG. 14 shows a flowchart indicating a processing procedure for displaying a list of registered items.

FIG. 14 shows a flowchart indicating a processing procedure for displaying the list of registered items (Step S104).

Initially, the CPU 11 reads out one of records, which are currently remaining unread, from the registration status table 202 (shown in FIG. 5) (Step S301). The readout operations of the records are performed in order of positional information [0, 1, - - -, n], and then, performed in order of positional information [−1, −2, - - -, −n].

Successively, in Step S302, the CPU 11 determines whether or not the value of the positional information of the readout record is equal to or greater than "0", namely, whether the item of the readout record concerned is to be displayed on the registered item list <RIGHT AREA> or the registered item list <LEFT AREA>.

When determining that the value of the positional information of the readout record is equal to or greater than "0" (Step S302; Yes), the CPU 11 displays the item of the readout record on the registered item list <LEFT AREA> 606 (shown in FIG. 9) (Step S303). Concretely speaking, based on the item ID of the concerned record read out in Step S301, the CPU 11 retrieve the registrable item ID table 201 so as to acquire the item (name). Then, the CPU 11 adds the acquired item (name) to the registered item list <LEFT AREA> 606.

When determining that the value of the positional information of the readout record is smaller than "0" (Step S302; No), the CPU 11 displays the item of the readout record on the registered item list <RIGHT AREA> 608 (shown in FIG. 9) (Step S304). Concretely speaking, based on the item ID of the concerned record read out in Step S301, the CPU 11 retrieve the registrable item ID table 201 so as to acquire the item (name). Then, the CPU 11 adds the acquired item (name) to the registered item list <RIGHT AREA> 608.

Still successively, in Step S305, the CPU 11 determines whether or not the processing operations for all of the records included in the registration status table 202 have been completed. Namely, the CPU 11 confirms that the record, which is still remaining unread, does not exist in registration status table 202.

As a result of the above confirming operation, when determining that the processing operations for all of the records included in the registration status table 202 have been completed (Step S305; Yes), the CPU 11 finalizes the processing procedure in the flowchart shown in FIG. 14 and makes the processing procedure proceed to Step S105 in the flowchart shown in FIG. 12.

On the other hand, when determining that the record, which is remaining unread, still exist in registration status table 202 (Step S305; No), the CPU 11 makes the processing procedure return to Step S301.

Figure 15:
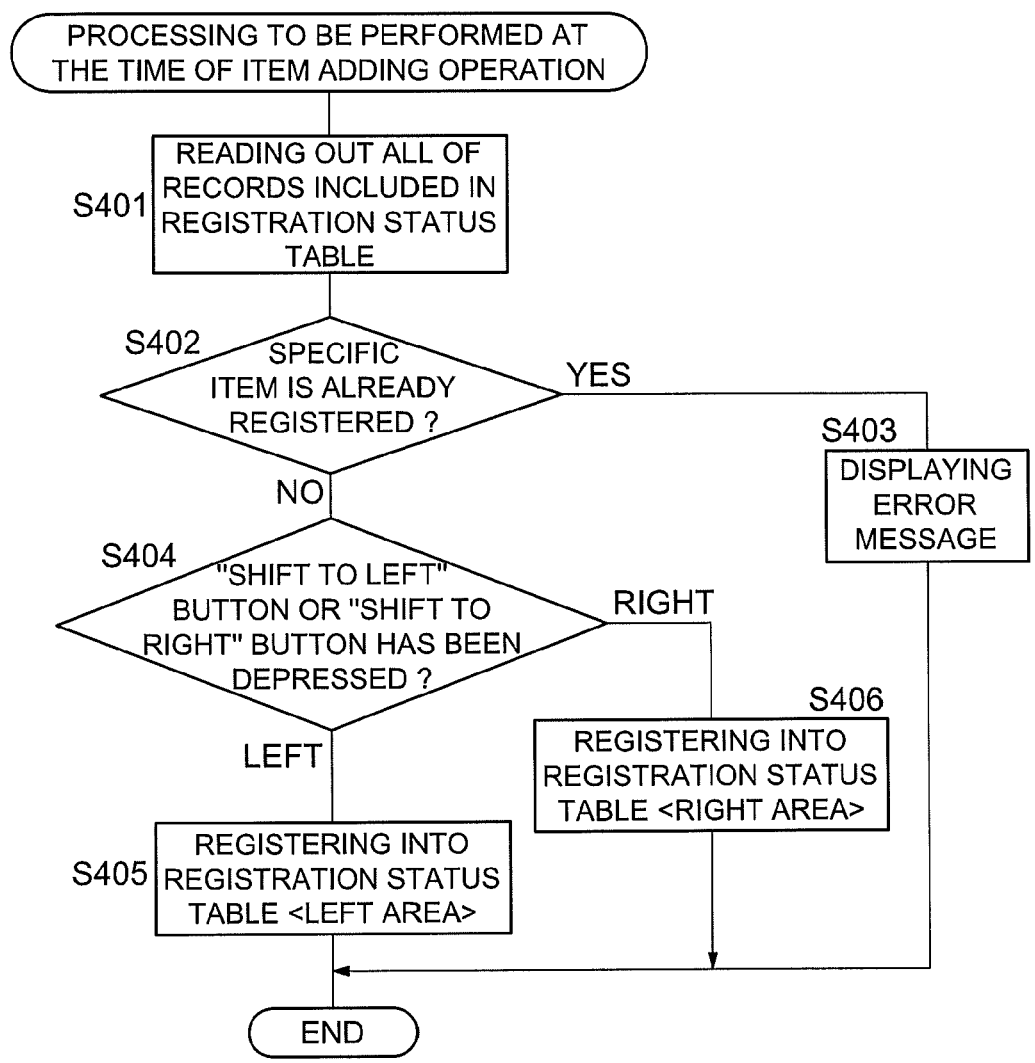
FIG. 15 shows a flowchart indicating a processing procedure to be performed at the time of an item adding operation.

FIG. 15 shows a flowchart indicating the processing procedure to be performed at the time of the item adding operation. In this connection, the algorism indicated in the flowchart shown in FIG. 15 is stored in the HDD 14 as the program, which is to be read out onto the RAM 13 and executed by the CPU 11 of the PC1.

The flowchart shown in FIG. 15 indicates the processing procedure for revising the registration status table 202, when the user depresses either the "shift to left" button 604 or the "shift to RIGHT" button 605, while selecting a specific item in the registrable item list 601 of the My-tub editing screen 600 shown in FIG. 9.

Initially, the CPU 11 reads out all of the records included in the registration status table 202 (shown in FIG. 5), therefrom (Step S401).

Successively, the CPU 11 determines whether or not the specific item selected by the user is already registered into the registration status table 202 read out in Step S401 (Step S402). In other words, the CPU 11 determines whether or not a specific record, having the item ID of the specific item selected from the registrable item list 601 by the user, is already registered into the registration status table 202.

When determining that the specific item selected by the user is already registered (Step S402; Yes), the CPU 11 makes the display section 15 display an error message thereon.

Figure 16:
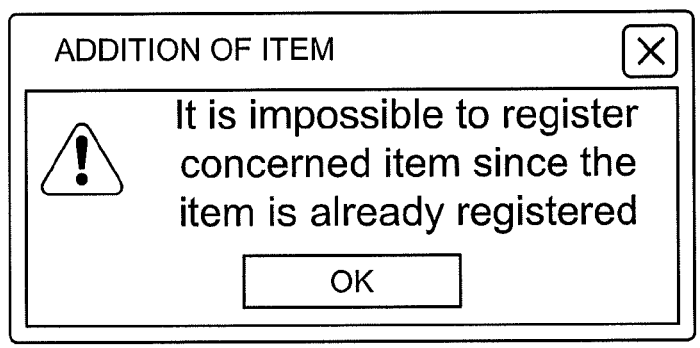
FIG. 16 shows a schematic diagram exemplifying an error message.

FIG. 16 shows a schematic diagram exemplifying the error message. In the case Shown in FIG. 16, the error message is displayed on the basis of the determination that the user erroneously tries to add the already registered item again at the time of the item adding operation.

When determining that the specific item selected by the user is not yet registered (Step S402; No), the CPU 11 makes the processing procedure proceed to Step S404.

In Step S404, the CPU 11 determines whether the "SHIFT TO LEFT" button 604 or the "SHIFT TO RIGHT" button 605 has been depressed at the initial step of the flowchart shown in FIG. 15.

When determining that the "SHIFT TO LEFT" button 604 has been depressed (Step S404; Left), the CPU 11 makes the specific item, selected by the user, have such an attribute value that makes the concerned specific item display on the registered item list <LEFT AREA> 606, and then, registers it into the registration status table 202 (Step S405). Namely, the specific item, selected by the user, is registered in the registration status table 202 so that the value represented by the positional information 206 of the specific item becomes equal to or greater than "0".

Concretely speaking, a value of positional information, which is equal to or greater than "0" and is the maximum value among the values included in the registration status table 202, is selected therefrom, and the acquired value is defined as "P". Then, the CPU 11 creates such a record whose item ID is the same as that of the specific item selected from the registrable item list 601 by the user and whose positional information represents a value "(P+1)", and adds the created record into the registration status table 202 so as to achieve the registration of the record concerned. After that, the CPU 11 finalizes the processing procedure of the flowchart shown in FIG. 15.

When determining that the "SIFT TO RIGHT" button 605 has been depressed (Step S404; Right), the CPU 11 makes the specific item, selected by the user, have such an attribute value that makes the concerned specific item display on the registered item list <RIGHT AREA> 608, and then, registers it into the registration status table 202 (Step S406). Namely, the specific item, selected by the user, is registered in the registration status table 202 so that the value represented by the positional information 206 of the specific item becomes smaller than "0".

Concretely speaking, a value of positional information, which is smaller than "0" and is the minimum value among the values included in the registration status table 202, is selected therefrom, and the acquired value is defined as "Q". Then, the CPU 11 creates such a record whose item ID is the same as that of the specific item selected from the registrable item list 601 by the user and whose positional information represents a value "(Q−1)", and adds the created record into the registration status table 202 so as to achieve the registration of the record concerned. After that, the CPU 11 finalizes the processing procedure of the flowchart shown in FIG. 15.

Figure 17:
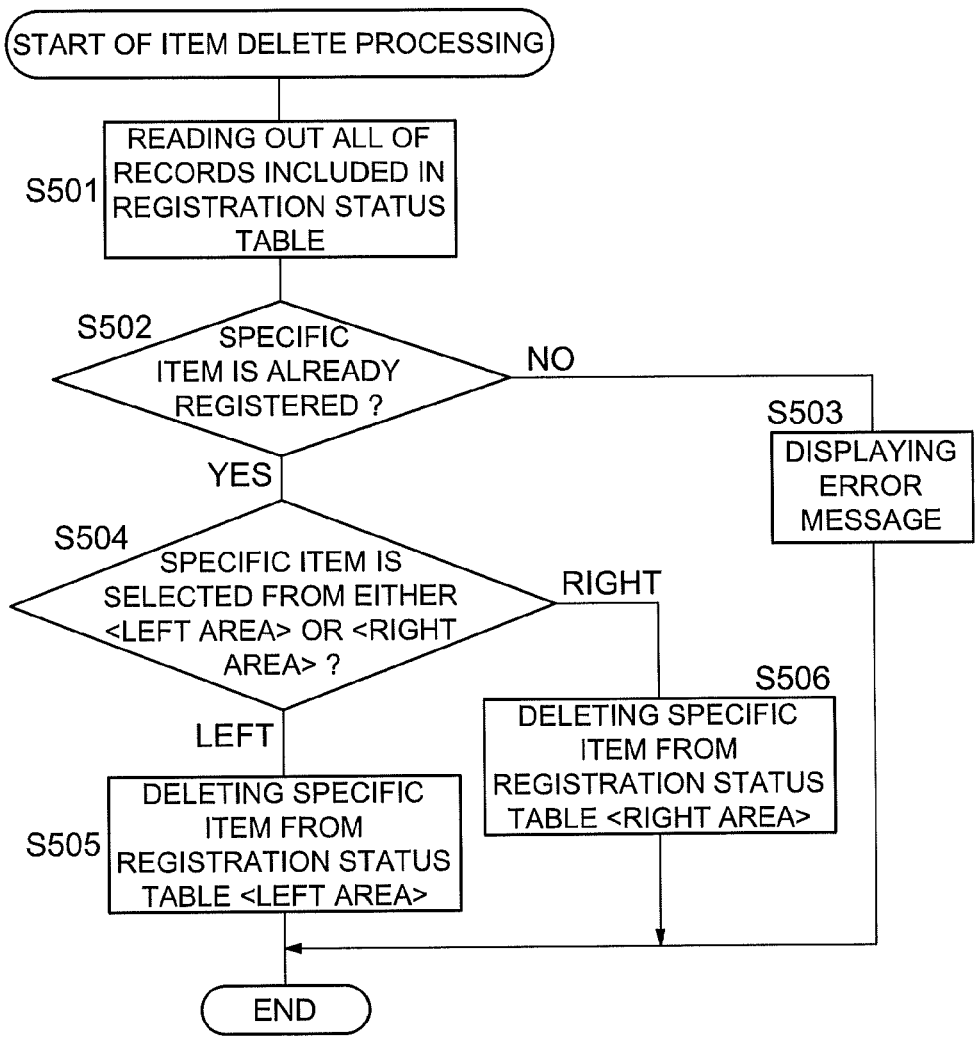
FIG. 17 shows a flowchart indicating a processing procedure to be performed at the time of an item deleting operation.

FIG. 17 shows a flowchart indicating the processing procedure to be performed at the time of the item deleting operation. In this connection, the algorism indicated in the flowchart shown in FIG. 17 is stored in the HDD 14 as the program, which is to be read out onto the RAM 13 and executed by the CPU 11 of the PC1.

The flowchart shown in FIG. 17 indicates the processing procedure for revising the registration status table 202, when the user depresses the delete button 610 in the My-tub editing screen 600 shown in FIG. 9.

Initially, the CPU 11 reads out all of the records included in the registration status table 202 (shown in FIG. 5), therefrom (Step S501).

Successively, the CPU 11 determines whether or not the specific item selected by the user is already registered into the registration status table 202 read out in Step S501 (Step S502). In other words, the CPU 11 determines whether or not a specific record, having the item ID of the specific item selected from the registered item list <LEFT AREA> 606 or the registered item list <RIGHT AREA> 608 by the user, is already registered into the registration status table 202.

When determining that the specific item selected by the user is not yet registered (Step S502; No), the CPU 11 makes the display section 15 display an error message thereon (Step S503). In this embodiment, the abovementioned case corresponds to such a case that the user depresses the delete button 610 in the state that none of the items included in either the registered item list <LEFT AREA> 606 or the registered item list <RIGHT AREA> 608 is selected by the user. In this case, since the item ID of the specific item selected by the user is set at "null", the CPU 11 determines that the record having the item ID of "null" is not yet registered.

Figure 18:
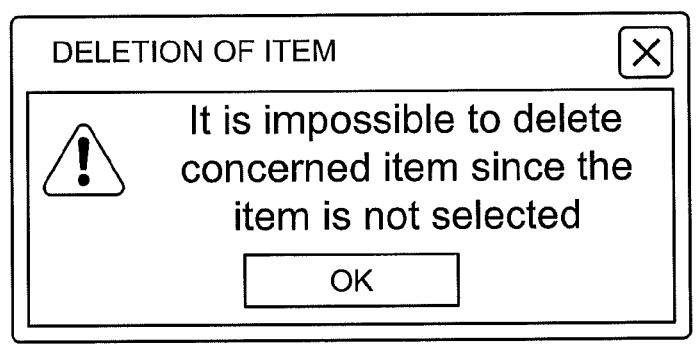
FIG. 18 shows a schematic diagram exemplifying an error message.

FIG. 18 shows a schematic diagram exemplifying the error message. In the case shown in FIG. 18, the error message is displayed on the basis of the determination that the user has not selected the item, which should be an object to be deleted, at the time of the item deleting operation.

When determining that the specific item selected by the user is already registered (Step S502; Yes), the CPU 11 makes the processing procedure proceed to Step S504.

In Step S504, the CPU 11 determines whether the specific item is selected from the registered item list <LEFT AREA> 606 or the registered item list <RIGHT AREA> 608 by the user at the initial step of the flowchart shown in FIG. 17.

When determining that the specific item is selected from the registered item list <LEFT AREA> 606 (Step S504; Left), the specific item selected by the user (value represented by the positional information 206 is equal to or greater than "0") is deleted from the registration status table 202 (Step S505).

Concretely speaking, a record having the item ID same as that of the item selected from the registered item list <LEFT AREA> 606 is read out from the registration status table 202 so as to acquire its positional information, and a value represented by the acquired positional information is defined as "P". Successively, the record having the value "P" represented by the acquired positional information is deleted from the registration status table 202. After the above deleting operation is completed, if a record having the value represented by the positional information, which is greater than the value "P", exists in the registration status table 202, the CPU 11 applies an updating operation to the concerned record, according to the Equation of ("value of updated positional information"="value of current positional information"−1), and then, finalizes the processing procedure in the flowchart shown in FIG. 17.

When determining that the specific item is selected from the registered item list <RIGHT AREA> 608 (Step S504; Right), the specific item selected by the user (value represented by the positional information 206 is smaller than "0") is deleted from the registration status table 202 (Step S506).

Concretely speaking, a record having the item ID same as that of the item selected from the registered item list <RIGHT AREA> 608 is read out from the registration status table 202 so as to acquire its positional information, and a value represented by the acquired positional information is defined as "Q". Successively, the record having the value "Q" represented by the acquired positional information is deleted from the registration status table 202. After the above deleting operation is completed, if a record having the value represented by the positional information, which is smaller than the value "Q", exists in the registration status table 202, the CPU 11 applies an updating operation to the concerned record, according to the Equation of ("value of updated positional information"="value of current positional information"+1), and then, finalizes the processing procedure in the flowchart shown in FIG. 17.

Figure 19:
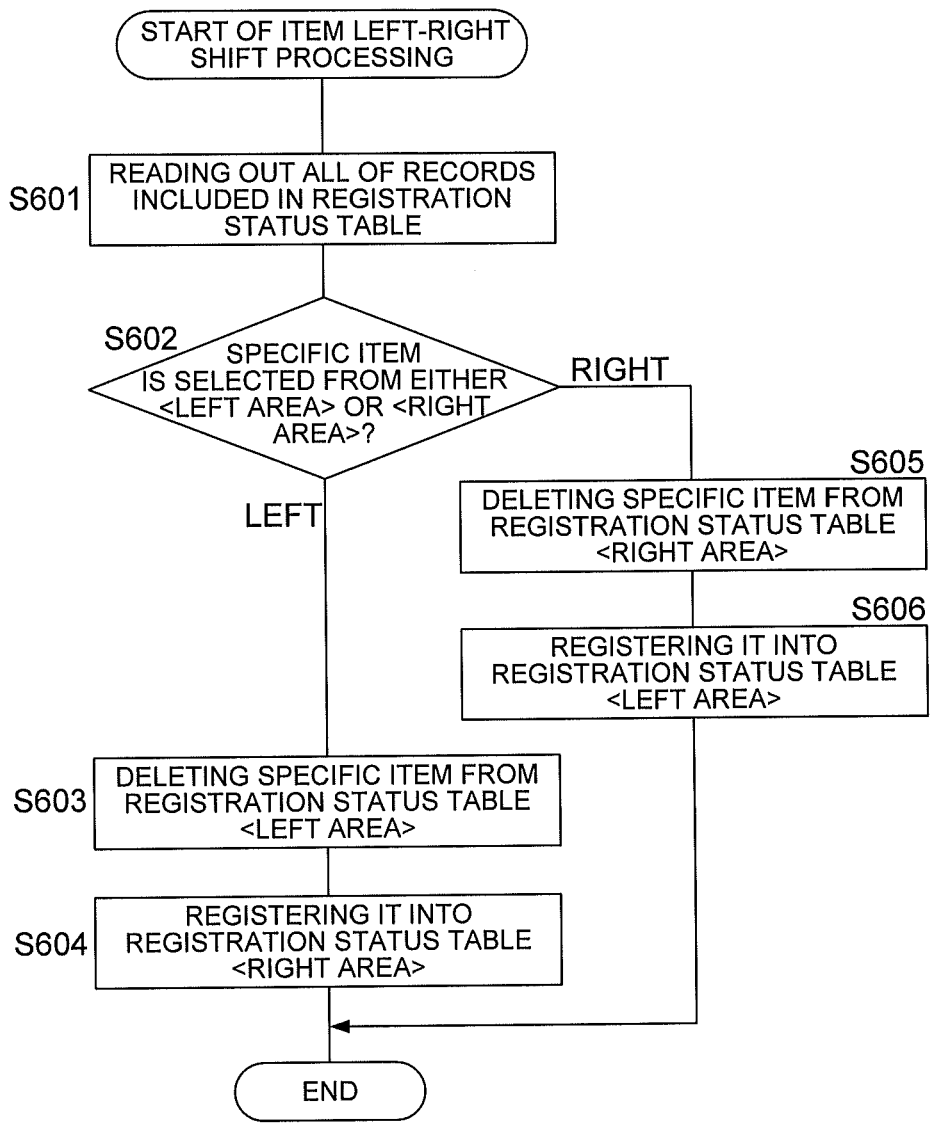
FIG. 19 shows a flowchart indicating a processing procedure to be performed at the time of an item left-right shifting operation.

FIG. 19 shows a flowchart indicating the processing procedure to be performed at the time of the item left-right shifting operation. In this connection, the algorism indicated in the flowchart shown in FIG. 19 is stored in the HDD 14 as the program, which is to be read out onto the RAM 13 and executed by the CPU 11 of the PC1.

The flowchart shown in FIG. 19 indicates the processing procedure for revising the registration status table 202, when the user depresses the left-right shift button 611, while selecting a specific item in either the registered item list <LEFT AREA> 606 or the registered item list <RIGHT AREA> 608, displayed within the My-tub editing screen 600 shown in FIG. 9.

Initially, the CPU 11 reads out all of the records included in the registration status table 202 (shown in FIG. 5), therefrom (Step S601).

Successively, in Step S602, the CPU 11 determines whether the specific item has been selected from the registered item list <LEFT AREA> 606 or the registered item list <RIGHT AREA> 608 by the user at the initial step of the flowchart shown in FIG. 19.

When determining that the specific item is selected from the registered item list <LEFT AREA> 606 (Step S602; Left), the specific item selected by the user (value represented by the positional information 206 is equal to or greater than "0") is deleted from the registration status table 202 (Step S603).

Concretely speaking, a record having the item ID same as that of the item selected from the registered item list <LEFT AREA> 606 is read out from the registration status table 202 so as to acquire its positional information, and a value represented by the acquired positional information is defined as "P". Successively, the record having the value "P" represented by the acquired positional information is deleted from the registration status table 202. After the above deleting operation is completed, if a record having the value represented by the positional information, which is greater than the value "P", exists in the registration status table 202, the CPU 11 applies an updating operation to the concerned record, according to the Equation of ("value of updated positional information"="value of current positional information"−1).

Successively, the specific item selected by the user is registered into the registration status table 202, associated with the positional information 206 representing a value being smaller than "0" (Step S604).

Concretely speaking, a value of positional information, which is smaller than "0" and is the minimum value among the values included in the registration status table 202, is selected therefrom, and the acquired value is defined as "Pa". Then, the CPU 11 creates such a record whose item ID is the same as that of the specific item selected from the registrable item list 601 by the user and whose positional information represents a value "(Pa−1)", and adds the created record into the registration status table 202 so as to achieve the registration of the record concerned. After that, the CPU 11 finalizes the processing procedure of the flowchart shown in FIG. 19.

On the other hand, when determining that the specific item is selected from the registered item list <RIGHT AREA> 608 (Step S602; Right), the specific item selected by the user (value represented by the positional information 206 is smaller than "0") is deleted from the registration status table 202 (Step S605).

Concretely speaking, a record having the item ID same as that of the item selected from the registered item list <RIGHT AREA> 608 is read out from the registration status table 202 so as to acquire its positional information, and a value represented by the acquired positional information is defined as "Q". Successively, the record having the value "Q" represented by the acquired positional information is deleted from the registration status table 202. After the above deleting operation is completed, if a record having the value represented by the positional information, which is smaller than the value "Q", exists in the registration status table 202, the CPU 11 applies an updating operation to the concerned record, according to the Equation of ("value of updated positional information"="value of current positional information"+1).

Successively, the specific item selected by the user is registered into the registration status table 202, associated with the positional information 206 representing a value being equal to or greater than "0" (Step S604).

Concretely speaking, a value of positional information, which is equal to or greater than "0" and is the maximum value among the values included in the registration status table 202, is selected therefrom, and the acquired value is defined as "Qa". Then, the CPU 11 creates such a record whose item ID is the same as that of the specific item selected from the registrable item list 601 by the user and whose positional information represents a value "(Qa+1)", and adds the created record into the registration status table 202 so as to achieve the registration of the record concerned. After that, the CPU 11 finalizes the processing procedure of the flowchart shown in FIG. 19.

Figure 20:
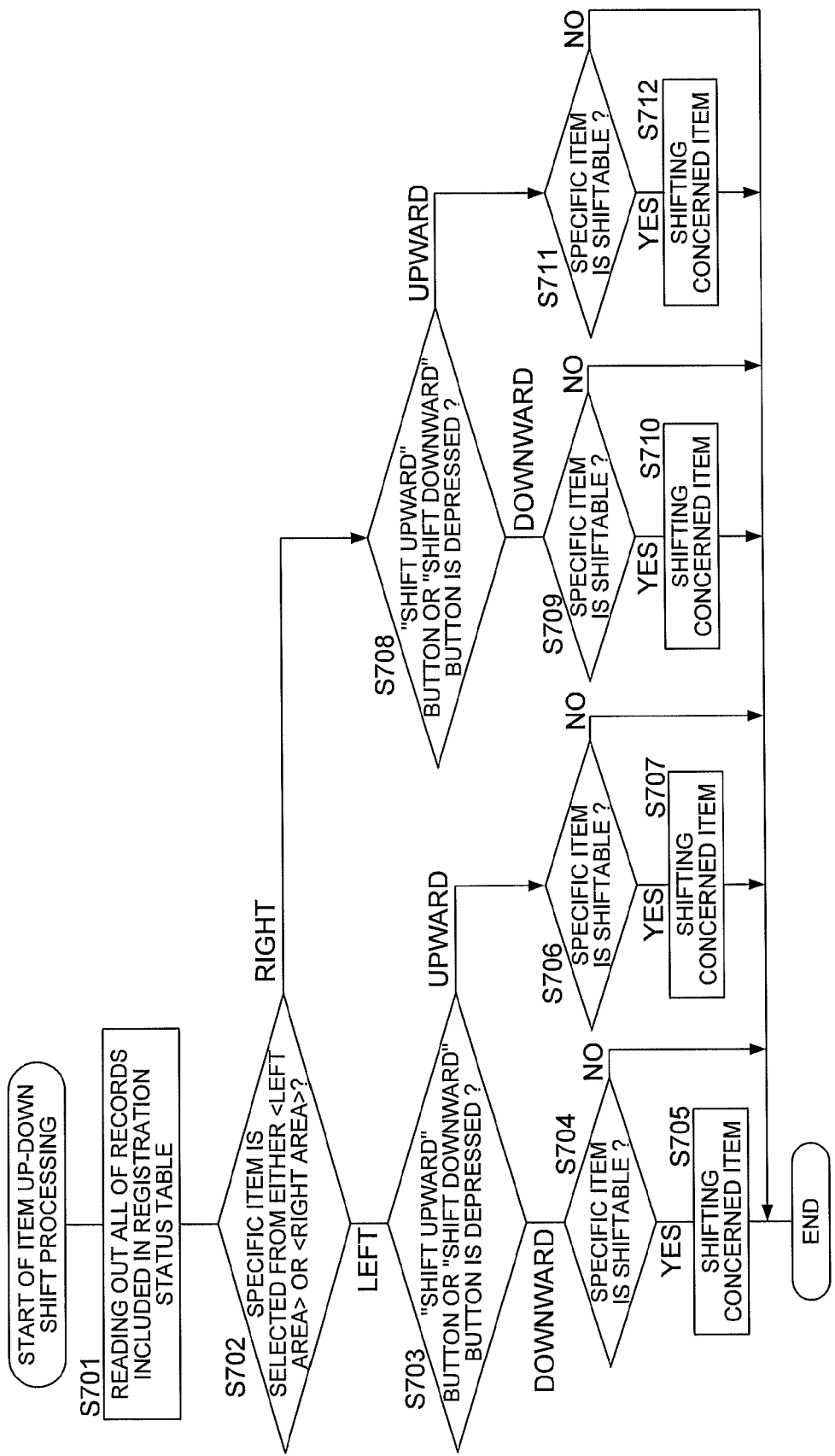
FIG. 20 shows a flowchart indicating a processing procedure to be performed at the time of an item up-down shifting operation.

FIG. 20 shows a flowchart indicating the processing procedure to be performed at the time of the item up-down shifting operation. In this connection, the algorism indicated in the flowchart shown in FIG. 20 is stored in the HDD 14 as the program, which is to be read out onto the RAM 13 and executed by the CPU 11 of the PC1.

The flowchart shown in FIG. 20 indicates the processing procedure for revising the registration status table 202, when the user depresses the "SHIFT UPWARD" button 613 or the "SHIFT DOWNWARD" button 612, while selecting a specific item in either the registered item list <LEFT AREA> 606 or the registered item list <RIGHT AREA> 608, displayed within the My-tub editing screen 600 shown in FIG. 9.

Initially, the CPU 11 reads out all of the records included in the registration status table 202 (shown in FIG. 5), therefrom (Step S701).

Successively, in Step S702, the CPU 11 determines whether the specific item has been selected from the registered item list <LEFT AREA> 606 or the registered item list <RIGHT AREA> 608 by the user at the initial step of the flowchart shown in FIG. 20.

When determining that the specific item is selected from the registered item list <LEFT AREA> 606 (Step S702; Left), the CPU 11 applies the up-down shift processing to the specific item selected from the registration status table 202 by the user (the value represented by the positional information 206 is equal to or greater than "0") (Step S703 through Step S707).

On the other hand, when determining that the specific item is selected from the registered item list <RIGHT AREA> 608 (Step S702; Right), the CPU 11 applies the up-down shift processing to the specific item selected from the registration status table 202 by the user (the value represented by the positional information 206 is smaller than "0") (Step S708 through Step S712).

In Step S703, the CPU 11 determines whether the "SHIFT UPWARD" button 613 or the "SHIFT DOWNWARD" button 612 has been depressed at the initial step of the flowchart shown in FIG. 20.

When determining that the "SHIFT DOWNWARD" button 612 has been depressed (Step S703; Down), the CPU 11 further determines whether or not the specific item selected from the registration status table 202 by the user (the value represented by the positional information 206 is equal to or greater than "0") can be shifted downward (Step S704).

Concretely speaking, a record having the item ID same as that of the item selected from the registered item list <LEFT AREA> 606 is read out from the registration status table 202 so as to acquire its positional information, and a value represented by the acquired positional information is defined as "P". Then, the CPU 11 determines whether or not a record having the value represented by the positional information, which is greater than the value "P", exists in the registration status table 202. When determining that a record, having the value being greater than the value "P", exists, the CPU 11 determines that the concerned record is shiftable, while, when determining that a record, having the value being greater than the value "P", does not exist, the CPU 11 determines that the concerned record is not shiftable.

When determining that the specific record is not shiftable (Step S704; No), the CPU 11 finalizes the processing procedure of the flowchart shown in FIG. 20.

On the other hand, when determining that the specific record is shiftable (Step S704; Yes), the CPU 11 makes the specific item, selected from the registration status table 202 by the user (the value represented by the positional information 206 is equal to or greater than "0"), shift downward (Step S705), and then, finalizes the processing procedure of the flowchart shown in FIG. 20.

Concretely speaking, a record having the item ID same as that of the item selected from the registered item list <LEFT AREA> 606 is read out from the registration status table 202 so as to acquire its positional information, and a value represented by the acquired positional information is defined as "P". Further, a record having the value "(P+1)" represented by its positional information is read out from the registration status table 202 so as to acquire its item ID, and the acquired item ID is defined as "R". Successively, the item ID of the record having the value "P" represented by its positional information is set at "R", so as to update the record concerned. Still further, the item ID of the other record having the value "(P+1)" represented by its positional information is set at the item ID of the specific item selected from the registered item list <LEFT AREA> 606, so as to update the other record concerned.

Returning to Step S703, when determining that the "SHIFT UPWARD" button 613 has been depressed (Step S703; Up), the CPU 11 further determines whether or not the specific item selected from the registration status table 202 by the user (the value represented by the positional information 206 is equal to or greater than "0") can be shifted upward (Step S706).

Concretely speaking, a record having the item ID same as that of the item selected from the registered item list <LEFT AREA> 606 is read out from the registration status table 202 so as to acquire its positional information, and a value represented by the acquired positional information is defined as "P". Then, the CPU 11 determines whether or not a record having the value represented by the positional information, which is equal to or greater than "0" and smaller than the value "P", exists in the registration status table 202. When determining that a record, having the value being equal to or greater than "0" and smaller than the value "P", exists, the CPU 11 determines that the concerned record is shiftable, while, when determining that a record, having the value being equal to or greater than "0" and smaller than the value "P", does not exist, the CPU 11 determines that the concerned record is not shiftable.

When determining that the specific record is not shiftable (Step S706; No), the CPU 11 finalizes the processing procedure of the flowchart shown in FIG. 20.

On the other hand, when determining that the specific record is shiftable (Step S706; Yes), the CPU 11 makes the specific item, selected from the registration status table 202 by the user (the value represented by the positional information 206 is equal to or greater than "0"), shift upward (Step S707), and then, finalizes the processing procedure of the flowchart shown in FIG. 20.

Concretely speaking, a record having the item ID same as that of the item selected from the registered item list <LEFT AREA> 606 is read out from the registration status table 202 so as to acquire its positional information, and a value represented by the acquired positional information is defined as "P". Further, a record having the value "(P−1)" represented by its positional information is read out from the registration status table 202 so as to acquire its item ID, and the acquired item ID is defined as "R". Successively, the item ID of the record having the value "P" represented by its positional information is set at "R", so as to update the record concerned. Still further, the item ID of the other record having the value "(P−1)" represented by its positional information is set at the item ID of the specific item selected from the registered item list <LEFT AREA> 606, so as to update the other record concerned.

In Step S708, the CPU 11 determines whether the "SHIFT UPWARD" button 613 or the "SHIFT DOWNWARD" button 612 has been depressed at the initial step of the flowchart shown in FIG. 20.

When determining that the "SHIFT DOWNWARD" button 612 has been depressed (Step S708; Down), the CPU 11 further determines whether or not the specific item selected from the registration status table 202 by the user (the value represented by the positional information 206 is smaller than "0") can be shifted downward (Step S709).

Concretely speaking, a record having the item ID same as that of the item selected from the registered item list <LEFT AREA> 606 is read out from the registration status table 202 so as to acquire its positional information, and a value represented by the acquired positional information is defined as "P". Then, the CPU 11 determines whether or not a record having the value represented by the positional information, which is smaller than the value "P", exists in the registration status table 202. When determining that a record, having the value being smaller than the value "P", exists, the CPU 11 determines that the concerned record is shiftable, while, when determining that a record, having the value being smaller than the value "P", does not exist, the CPU 11 determines that the concerned record is not shiftable.

When determining that the specific record is not shiftable (Step S709; No), the CPU 11 finalizes the processing procedure of the flowchart shown in FIG. 20.

On the other hand, when determining that the specific record is shiftable (Step S709; Yes), the CPU 11 makes the specific item, selected from the registration status table 202 by the user (the value represented by the positional information 206 is smaller than "0"), shift downward (Step S710), and then, finalizes the processing procedure of the flowchart shown in FIG. 20.

Concretely speaking, a record having the item ID same as that of the item selected from the registered item list <LEFT AREA> 606 is read out from the registration status table 202 so as to acquire its positional information, and a value represented by the acquired positional information is defined as "P". Further, a record having the value "(P−1)" represented by its positional information is read out from the registration status table 202 so as to acquire its item ID, and the acquired item ID is defined as "R". Successively, the item ID of the record having the value "P" represented by its positional information is set at "R", so as to update the record concerned. Still further, the item ID of the other record having the value "(P−1)" represented by its positional information is set at the item ID of the specific item selected from the registered item list <LEFT AREA> 606, so as to update the other record concerned.

Returning to Step S708, when determining that the "SHIFT UPWARD" button 613 has been depressed (Step S708; Up), the CPU 11 further determines whether or not the specific item selected from the registration status table 202 by the user (the value represented by the positional information 206 is smaller than "0") can be shifted upward (Step S711).

Concretely speaking, a record having the item ID same as that of the item selected from the registered item list <LEFT AREA> 606 is read out from the registration status table 202 so as to acquire its positional information, and a value represented by the acquired positional information is defined as "P". Then, the CPU 11 determines whether or not a record having the value represented by the positional information, which is greater than "P" and smaller than the value "0", exists in the registration status table 202. When determining that a record, having the value being greater than "P" and smaller than the value "0", exists, the CPU 11 determines that the concerned record is shiftable, while, when determining that a record, having the value being greater than "P" and smaller than the value "0", does not exist, the CPU 11 determines that the concerned record is not shiftable.

When determining that the specific record is not shiftable (Step S711; No), the CPU 11 finalizes the processing procedure of the flowchart shown in FIG. 20.

On the other hand, when determining that the specific record is shiftable (Step S711; Yes), the CPU 11 makes the specific item, selected from the registration status table 202 by the user (the value represented by the positional information 206 is smaller than "0"), shift upward (Step S712), and then, finalizes the processing procedure of the flowchart shown in FIG. 20.

Concretely speaking, a record having the item ID same as that of the item selected from the registered item list <LEFT AREA> 606 is read out from the registration status table 202 so as to acquire its positional information, and a value represented by the acquired positional information is defined as "P". Further, a record having the value "(P+1)" represented by its positional information is read out from the registration status table 202 so as to acquire its item ID, and the acquired item ID is defined as "R". Successively, the item ID of the record having the value "P" represented by its positional information is set at "R", so as to update the record concerned. Still further, the item ID of the other record having the value "(P+1)" represented by its positional information is set at the item ID of the specific item selected from the registered item list <LEFT AREA> 606, so as to update the other record concerned.

Next, referring to FIG. 21 through FIG. 23, operations to be performed by the My-tub screen displaying module 130 will be detailed in the following.

Figure 21:
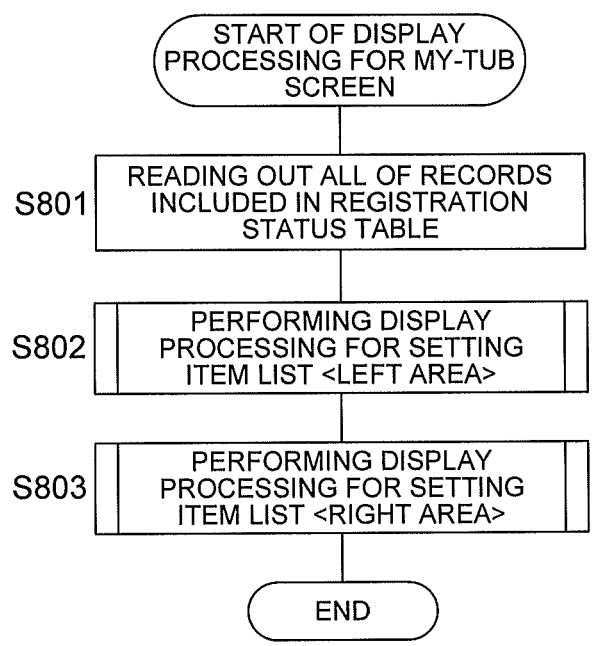
FIG. 21 shows a flowchart indicating a processing procedure to be performed by a My-tub screen displaying module.

FIG. 21 shows a flowchart indicating the processing procedure to be performed by the My-tub screen displaying module 130 (shown in FIG. 8). In this connection, the algorism indicated in the flowchart shown in FIG. 21 is stored in the HDD 14 as the program, which is to be read out onto the RAM 13 and executed by the CPU 11 of the PC1.

The flowchart shown in FIG. 21 indicates the processing procedure for displaying the setting item list <LEFT AREA> 501 and the setting item list <RIGHT AREA> 502, both included in the My-tub screen displaying module 130 shown in FIG. 8.

Initially, the CPU 11 reads out all of the records included in the registration status table 202 (shown in FIG. 5), therefrom (Step S801).

In Step S802, the CPU 11 performs a display processing for the setting item list <LEFT AREA> 501.

Successively, in Step S803, the CPU 11 performs a display processing for the setting item list <RIGHT AREA> 502.

In this connection, the display processing for the setting item list <LEFT AREA> 501 and the display processing for the setting item list <RIGHT AREA> 502 will be detailed later on.

Still successively, as a result of the abovementioned display processing, the My-tub screen 500 (shown in FIG. 8) is displayed on the display section 15 of the PC1 as the print setting screen.

Figure 22:
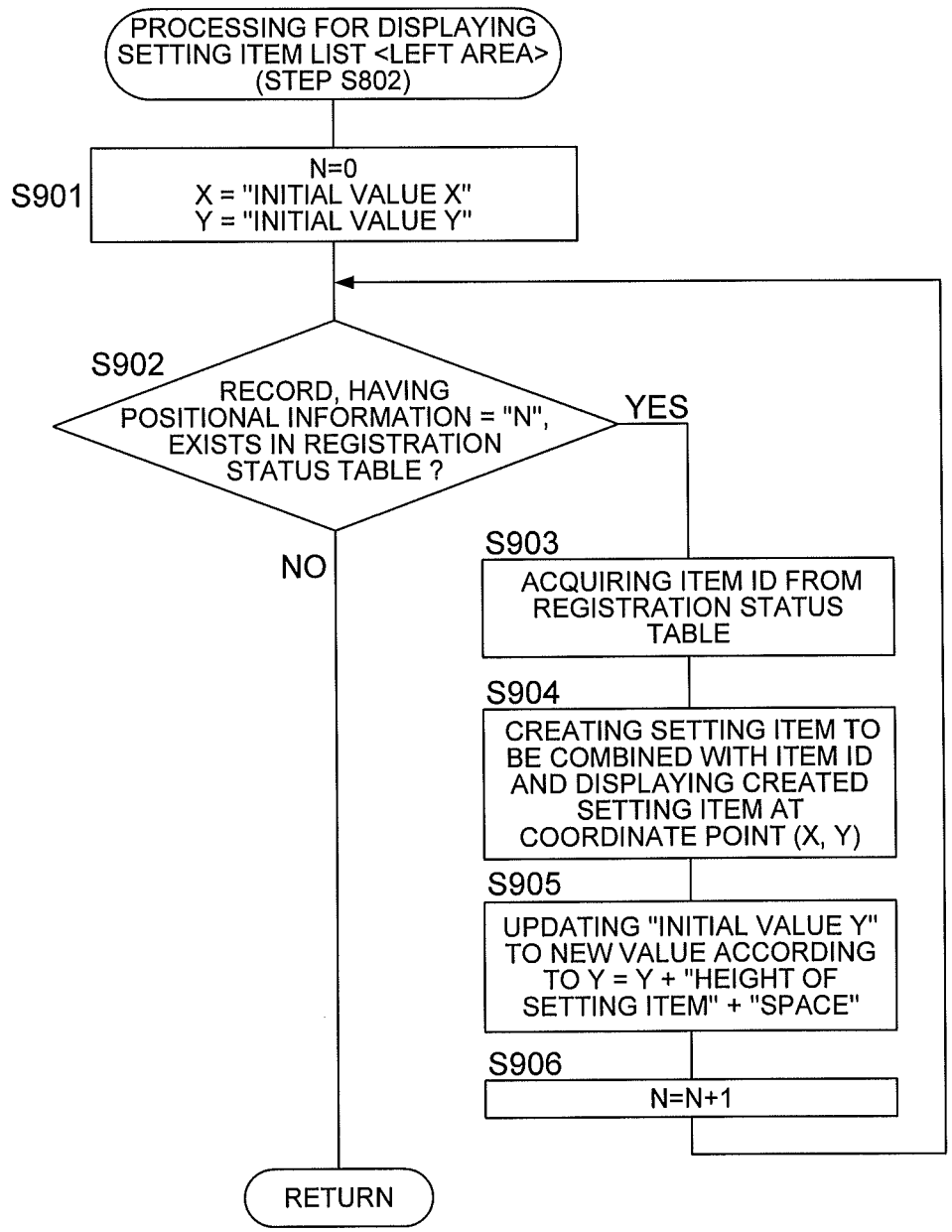
FIG. 22 shows a flowchart indicating a processing procedure for displaying a setting item list <LEFT AREA>.

FIG. 22 shows a flowchart indicating a processing procedure (Step S802) for displaying the setting item list <LEFT AREA> 501.

Initially, the CPU 11 initialize the values of "N" (defined as a positional information), "X" and "Y", initial values of which are set at "0", "initial value X" and "initial value Y", respectively (Step S901). The "initial value X" and the "initial value Y" represents coordinate initial values, which indicate a left-upper start point for displaying the setting item list <LEFT AREA> 501, when each of the setting items (screen structure control) is arranged on the My-tub screen 500. Setting the left-upper point as the start point, coordinate value "X" is defined as a value in the horizontal direction and coordinate value "Y" is defined as a value in the vertical direction. In this connection, either a number of points or a number of pixels is employed as a unit of the coordinate value.

In Step S902, the CPU 11 determines whether or not a record, having positional information="N", exists in the registration status table 202 (shown in FIG. 5).

When determining that the record, having positional information="N", exists (Step S902; Yes), the CPU 11 acquires the item ID from the record having positional information="N" and residing in the registration status table 202 (Step S903).

The CPU 11 creates the setting item to be combined with the above-acquired item ID (refer to FIG. 7), and displays the created setting item at the coordinate point (X, Y) within the area of the My-tub screen 500 (Step S904).

Successively, the CPU 11 updates the "initial value Y" to a new value ("Y"+"height of setting item" (shown in FIG. 6)+"space" (in this example, "10")). For instance, when the item ID is [ID_Orientation] and "initial value Y"=10, the "initial value Y" is updated to the new value of 65="Y 10"+"height of setting item=45"+"space=10" (Step S905).

Still successively, the CPU 11 updates the value of "N" to the new value of "N"="N+1" (Step S906), and then, makes the processing procedure return to Step S902.

Yet successively, when determining that the record, having positional information="N", does not exist (Step S902; No), the CPU 11 finalizes the processing procedure in the flowchart shown in FIG. 22, and then, makes the processing procedure return to the flowchart shown in FIG. 21.

Figure 23:
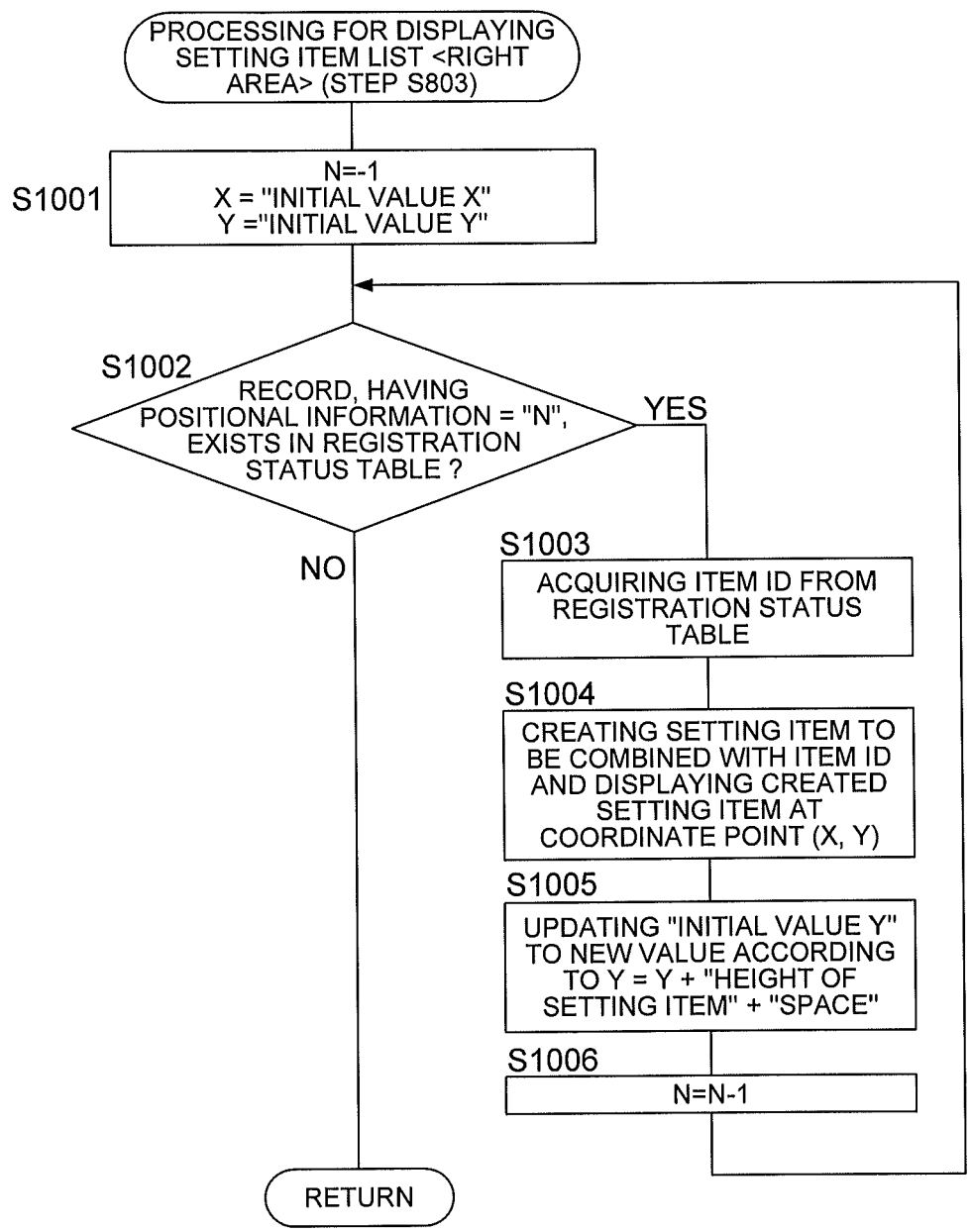
FIG. 23 shows a flowchart indicating a processing procedure for displaying a setting item list <RIGHT AREA>.

FIG. 23 shows a flowchart indicating a processing procedure (Step S803) for displaying the setting item list <RIGHT AREA> 502.

Initially, the CPU 11 initialize the values of "N" (defined as a positional information), "X" and "Y", initial values of which are set at "0", "initial value X" and "initial value Y", respectively (Step S1001). The "initial value X" and the "initial value Y" represents coordinate initial values, which indicate a left-upper start point for displaying the setting item list <RIGHT AREA> 502, when each of the setting items (screen structure control) is arranged on the My-tub screen 500. Setting the left-upper point as the start point, coordinate value "X" is defined as a value in the horizontal direction and coordinate value "Y" is defined as a value in the vertical direction. In this connection, either a number of points or a number of pixels is employed as a unit of the coordinate value.

In Step S1002, the CPU 11 determines whether or not a record, having positional information="N", exists in the registration status table 202 (shown in FIG. 5).

When determining that the record, having positional information="N", exists (Step S1002; Yes), the CPU 11 acquires the item ID from the record having positional information="N" and residing in the registration status table 202 (Step S1003).

The CPU 11 creates the setting item to be combined with the above-acquired item ID (refer to FIG. 7), and displays the created setting item at the coordinate point (X, Y) within the area of the My-tub screen 500 (Step S1004).

Successively, the CPU 11 updates the "initial value Y" to a new value ("Y"+"height of setting item" (shown in FIG. 6)+"space" (in this example, "10")) (Step S1005).

Still successively, the CPU 11 updates the value of "N" to the new value of "N"="N+1" (Step S1006), and then, makes the processing procedure return to Step S1002.

Yet successively, when determining that the record, having positional information="N", does not exist (Step S1002; No), the CPU 11 finalizes the processing procedure in the flowchart shown in FIG. 23, and then, makes the processing procedure return to the flowchart shown in FIG. 21.

As described in the foregoing, according to the embodiment of the present invention, a list of plural setting items, which are registrable in order to provide them for the processing for editing the My-tub screen constituted by setting items registered on the basis of the user's operation for selecting them from a plurality of setting items for specifying the print conditions, are displayed on the display, and, with respect to at least one of the plural setting items concerned, the instruction for registering information including an attribute value indicating the registration status is accepted on the basis of the user's operation. Then, the registered setting items are provided for the processing for editing the My-tub screen, according to the concerned attribute value registered in the above.

Accordingly, at the time when the registered setting item is provided for the My-tub screen edit processing, it is possible to also designate the attribute value indicating the registration status at the same time of the registration. Therefore, it becomes possible to provide the registered setting item for the My-tub screen edit processing, while making it correspond to the user's request.

Further, according to the embodiment of the present invention, since the attribute value is represented by the positional information of the setting item residing within the My-tub screen, it becomes possible to make the screen structure of the edited My-tub screen appropriately conformity with the user's request, resulting in an improvement of the maneuverability of the print setting operation to be conducted by the user. Still further, according to the embodiment of the present invention, since the positional information is defined as either the left positional information or the right positional information, it becomes possible for the user to designate the left-right layout of the edited My-tub screen, resulting in further improvement of the maneuverability of the My-tub screen.

Still further, according to the embodiment of the present invention, when the instruction of the registration is accepted, the attached image corresponding to the attribute value of the concerned registration is also displayed, associating with the setting item for which the instruction of the registration is accepted among setting items included in the concerned list. Accordingly, with respect to the setting item currently displayed within the list, it is possible for the user to easily grasp not only a presence or absence of its registration, but also a current status of its registration. Further, when the attribute value is represented by the positional information of the setting item included in the My-tub screen, it becomes possible for the user to easily recognize the status of whether or not a certain setting item has been registered as the structural element of the My-tub screen, and a position where the certain setting item is to be arranged within the My-tub screen.

Still further, according to the embodiment of the present invention, when the user's operation for selecting a selection-use tub from the plural selection-use tubs, which are respectively correspond to the plural fixed tubs, is accepted, the list of setting items correlating to the selected selection-use tub are displayed as the list of plural setting items being registrable so as to provide it for the My-tub screen edit processing operation. Accordingly, it becomes possible for the user to select a setting item, which is to be added to the My-tub screen, from a list of layouts being approximate to a print setting screen, which is normally used by a fixed tub, resulting in an easiness of the operation for editing the My-tub screen, and a reduction of the working time to be consumed for editing the My-tub screen.

Yet further, according to the embodiment of the present invention, after the instruction of the registration has been accepted, the change of the attribute value is accepted on the basis of the user's operation. Accordingly, it becomes possible to speedily cope with the user's demand on the registration status, even after the instruction of the registration has been accepted.

The scope of the present invention is not limited to the embodiment described in the foregoing. Various kinds of modifications and additions, made by a skilled person without departing from the spirit and scope of the invention, shall be included in the scope of the present invention.

For instance, although the positional information of the setting item, which is included in the My-tub screen and serves as the attribute value, is defined with respect to a left or right area in the embodiment aforementioned, the scope of the present invention is not limited to the above-definition. In the present invention, it is also applicable that positional information of a setting item is defined with respect to, for instance, any one of setting items in a plurality of My-tub screens, a upper or lower position (numbering order from the up-most item), etc.

Further, although, according to the disclosed embodiment, both a group of setting items, to be displayed on the left area in the My-tub screen, and another group of setting items, to be displayed on the right area in the My-tub screen, are registered in the registration status table 202, the scope of the present invention is not limited to the above. It is also applicable that the group of setting items and the other group of setting items are registered in separate registered status tables, respectively.

Still further, although the preferred embodiment of the present invention has been described by exemplifying the processing procedure for editing the print setting screen, which is constituted by such the setting items that are registered on the basis of the user's operation for selecting them from the plurality of setting items for specifying the print conditions, as the predetermined processing, the scope of the present invention is not limited to the preferred embodiment aforementioned. The present invention is also applicable for such a case that the registered items are provided for the predetermined processing. For instance, the present invention can be also applied to a processing operation for editing such a setting screen that is constituted by setting items registered on the basis of the user's operation for selecting them from the plurality of setting items.

The various kinds of processing, to be performed in the printing system embodied in the present invention, can be implemented by employing either an exclusive electronic circuit serving as hardware or a computer that executes a program serving as software for implementing the processing concerned. For instance, it is applicable that the abovementioned program is provided either by the computer readable storage medium, such as the flexible disc, a CD-ROM, etc., or through a network, such as an Internet, etc., in an on-line mode. Generally speaking in respect to the above case, the program stored in the computer readable storage medium is read out therefrom and transferred to a storage section, such as an HDD (Hard Disc Drive), etc., so as to store it therein. Further, it is applicable that the program is either provided as independent single application software or installed in advance into the apparatus concerned as a partial function of overall software installed.

According to the present invention, when providing the registered item for the predetermined processing, the user can designate the attribute value at the same time when registering the item concerned.

Accordingly, it becomes possible for the user to provide the registered item for the predetermined processing, while making the registered item correspond to the user's demand.

While the preferred embodiments of the present invention have been described using specific term, such description is for illustrative purpose only, and it is to be understood that changes and variations may be made without departing from the spirit and scope of the appended claims.

What is claimed is:

1. A non-transitory computer readable storage medium storing a computer executable program executable by a computer to cause the computer to perform a process comprising:
   (a) displaying a setting screen including a plurality of first tubs, in which prescribed setting items determined in advance are displayed, and a second tub, having a plurality of display positions in which setting items displayed within the plurality of first tubs are displayable;
   (b) displaying an editing screen including prescribed setting items in a list, the prescribed setting items being included in the first tubs of the setting screen and registrable into the second tub of the setting screen;
   (c) accepting a registration instruction in the editing screen for registering at least one of the prescribed setting items included in the list, and associating the registered at least one of the prescribed setting items with a designated one of the plurality of display positions in the second tub, based on an operation conducted by a user;
   (d) displaying an image, which indicates the designated display position of the registered at least one of the prescribed setting items in the second tub, in association with the registered at least one of the prescribed setting items included in the list in the editing screen, when the registration instruction is accepted in step (c); and
   (e) displaying on the setting screen the registered at least one of the prescribed setting items at the designated display position in the second tub.

2. The non-transitory computer readable storage medium of claim 1, the process further comprising:
   (f) accepting a user's selecting operation for selecting a specific list of prescribed setting items that corresponds to one of the plurality of first tubs, before performing the step (b).

3. The non-transitory computer readable storage medium of claim 1,
   wherein the image, which indicates the designated display position of the registered at least one of the prescribed setting items in the second tub, is an image that displays the registered at least one of the prescribed setting items at either a left side or a right side in the second tub.

4. The non-transitory computer readable storage medium of claim 1, the process further comprising:
   (g) accepting a user's instruction for changing the display position of the registered at least one of the prescribed setting items registered in step (c), or for releasing the registration of the registered at least one of the prescribed setting items registered in step (c), based on an operation conducted by the user after the registration instruction for registering the at least one of the prescribed setting items has been accepted in step (c).

5. A display method comprising:
   (a) displaying a setting screen including a plurality of first tubs, in which prescribed setting items determined in advance are displayed, and a second tub, having a plurality of display positions in which setting items displayed within the plurality of first tubs are displayable;
   (b) displaying an editing screen including prescribed setting items in a list, the prescribed setting items being included in the first tubs of the setting screen and registrable into the second tub of the setting screen;
   (c) registering in the editing screen at least one of the prescribed setting items included in the list, and associating the registered at least one of the prescribed setting items with a designated one of the plurality of display positions in the second tub, based on an operation conducted by the user;
   (d) displaying an image, which indicates the designated display position of the registered at least one of the prescribed setting items in the second tub, in association with the registered at least one of the prescribed setting items included in the list in the editing screen, when the registration instruction is accepted in step (c); and
   (e) displaying on the setting screen the registered at least one of the prescribed setting items at the designated display position in the second tub.

6. The method of claim 5, further comprising:
   (f) accepting a user's selecting operation for selecting a specific list of prescribed setting items that corresponds to one of the plurality of first tubs, before performing the step (b).

7. The method of claim 5,
   wherein the image, which indicates the designated display position of the registered at least one of the prescribed setting items in the second tub, is an image that displays the registered at least one of the prescribed setting items at either a left side or a right side in the second tub.

8. The method of claim 5, further comprising:
   (g) accepting a user's instruction for changing the display position of the registered at least one of the prescribed setting items, registered in step (c), or for releasing a registration of the registered at least one of the prescribed setting items registered in step (c), based on an operation conducted by the user after the registration instruction for registering the at least one of the prescribed setting items has been accepted in step (c).

9. An apparatus comprising:
a processor; and
a memory storing computer executable instructions that, when executed by the processor, causes the processor to perform a process including:
displaying a setting screen including a plurality of first tubs, in which prescribed setting items determined in advance are displayed, and a second tub, having a plurality of display positions in which setting items displayed within the plurality of first tubs are displayable;

displaying an editing screen including prescribed setting items in a list, the prescribed setting items being included in the first tubs of the setting screen and registrable into the second tub of the setting screen;

registering in the editing screen at least one of the prescribed setting items included in the list, and associate the registered at least one of the prescribed setting items with a designated one of the plurality of display positions in the second tub, based on an operation conducted by the user;

displaying an image, which indicates the designated display position of the registered at least one of the prescribed setting items in the second tub, in association with the registered at least one of the prescribed setting items included in the list in the editing screen, when the registration instruction is accepted; and displaying on the setting screen the registered at least one of the prescribed setting items at the designated display position in the second tub.

10. The apparatus of claim 9, wherein the process performed by the processor further includes accepting a user's selecting operation for selecting a specific list of prescribed setting items that corresponds to one of the plurality of first tubs, before the displaying the editing screen.

11. The apparatus of claim 9,
wherein the image, which indicates the designated display position of the registered at least one of the prescribed setting items in the second tub, is an image that displays the registered at least one of the prescribed setting items at either a left side or a right side in the second tub.

12. The apparatus of claim 9,
wherein the process performed by the processor further includes accepting a user's instruction for changing the display position of the registered at least one of the prescribed setting items registered in advance by the control section, or for releasing a registration of the registered at least one of the prescribed setting items registered in advance by the control section, based on an operation conducted by the user after the the registration instruction for registering the at least one of the prescribed setting items is accepted.

* * * * *